(12) United States Patent
Zhang

(10) Patent No.: US 10,075,075 B2
(45) Date of Patent: Sep. 11, 2018

(54) BUCK-BOOST POWER CONVERTER AND ASSOCIATED MODE TRANSITION CONTROL MODULE

(71) Applicant: Chengdu Monolithic Power Systems Co., Ltd., Chengdu (CN)

(72) Inventor: Jian Zhang, Chengdu (CN)

(73) Assignee: Chengdu Monolithic Power Systems, Co. Ltd. (CN)

( * ) Notice: Subject to any disclaimer, the term of this patent is extended or adjusted under 35 U.S.C. 154(b) by 141 days.

(21) Appl. No.: 14/757,869

(22) Filed: Dec. 23, 2015

(65) Prior Publication Data
US 2016/0190931 A1 Jun. 30, 2016

(30) Foreign Application Priority Data
Dec. 24, 2014 (CN) .......................... 2014 1 0815287

(51) Int. Cl.
*H02M 3/158* (2006.01)
*H02M 1/00* (2006.01)
(52) U.S. Cl.
CPC .. *H02M 3/1582* (2013.01); *H02M 2001/0009* (2013.01)
(58) Field of Classification Search
CPC .................................................. Y02B 70/1466
See application file for complete search history.

(56) References Cited

U.S. PATENT DOCUMENTS

| 2015/0002116 A1* | 1/2015 | Bernon-Enjalbert ....................... H02M 3/1582 323/271 |
| 2015/0229215 A1* | 8/2015 | Choudhary ............. H02M 1/14 323/271 |

* cited by examiner

*Primary Examiner* — Nguyen Tran
*Assistant Examiner* — Monica Mata
(74) *Attorney, Agent, or Firm* — Perkins Coie LLP

(57) ABSTRACT

A buck-boost power converter and a mode transition control module. The mode transition control module includes a buck duty cycle sensing and comparison circuit and a boost duty cycle sensing and comparison circuit. The buck duty cycle sensing and comparison circuit can provide a first mode transition control signal through comparing a first signal indicative of a buck duty cycle with a first threshold signal indicative of a buck duty threshold to regulate the buck-boost power converter to transit between a buck mode and a buck-boost mode. The boost duty cycle sensing and comparison circuit can provide a second mode transition control signal through comparing a second signal indicative of a boost duty cycle with a second threshold signal indicative of a boost duty threshold to regulate the buck-boost power converter to transit between a the buck-boost mode and a boost mode.

18 Claims, 12 Drawing Sheets

105

BUCK-BOOST POWER CONVERTER AND ASSOCIATED MODE TRANSITION CONTROL MODULE

CROSS REFERENCE

This application claims the benefit of CN application No. 201410815287.3 filed on Dec. 24, 2014 and incorporated herein by reference.

TECHNICAL FIELD

This disclosure relates generally to buck-boost power converters, and more particularly but not exclusively relates to mode transition control of buck-boost power converters.

BACKGROUND

Buck-boost power converters can convert an input voltage into an output voltage higher than, equal to or lower than the input voltage and can generally be operated with wide input voltage range. Therefore, buck-boost power converters are widely used in power management applications.

FIG. 1 illustrates a topology 10 of the power switches of a conventional buck-boost power converter. The topology 10 comprises a first power switch SWA, a second power switch SWB, a third power switch SWC and a fourth power switch SWD. The first power switches SWA and the second power switch SWB are coupled in series between an input port IN and a reference ground GND, and have a common connection SW1 referred to as a first switching node SW1. The third power switch SWC and the fourth power switch SWD are coupled in series between an output port OUT and the reference ground GND, and have a common connection SW2 referred to as a second switching node SW2. An inductor L is coupled between the first switching node SW1 and the second switching node SW2. The buck-boost power converter typically further comprise a control circuit to provide driving signals respectively to the control terminals GA, GB, GC and GD of the power switches SWA, SWB, SWC and SWD to control the on and off switching of the power switches SWA, SWB, SWC and SWD so as to converter an input voltage Vin at the input port IN to an appropriate output voltage Vo at the output port OUT.

A buck-boost power converter having the topology 10 as shown in FIG. 1 may operate in buck mode when the input voltage Vin is higher than the output voltage Vo, and operate in buck-boost mode when the input voltage Vin is equal/close to the output voltage Vo, and operate in boost mode when the input voltage Vin is lower than the output voltage Vo. In buck mode, the fourth power switch SWD is maintained ON, the third power switch SWC is maintained OFF, while the first power switch SWA and the second power switch SWB are switched ON and OFF complementarily, i.e. when the first power switch SWA is switched ON, the second power switch SWB is switched OFF, and vice versa. In boost mode, the first power switch SWA is maintained ON, the second power switch SWB is maintained OFF, while the third power switch SWC and the fourth power switch SWD are switched ON and OFF complementarily, i.e. when the third power switch SWC is switched ON, the fourth power switch SWD is switched OFF, and vice versa. In buck-boost mode, the first power switch SWA and the second power switch SWB form a first switch pair while the third power switch SWC and the fourth power switch SWD form a second switch pair, and the first switch pair and the second switch pair conduct ON and OFF switching independently.

Theoretically, the buck-boost power converter can be controlled to convert the input voltage Vin into any appropriate output voltage Vo through changing its operation mode among the buck mode, the boost mode and the buck-boost mode. However, in practical, the existing buck-boost power converters cannot transit smoothly from one mode to another among the buck mode, the boost mode and the buck-boost mode. Large sparks may occur in the output voltage Vo during the transition.

SUMMARY

In accomplishing the above and other objects, there has been provided, in accordance with an embodiment of the present disclosure, a mode transition control module for regulating a buck-boost power converter to transit between a buck mode and a buck-boost mode and between the buck-boost mode and a boost mode. The mode transition control module may comprise a buck duty cycle sensing and comparison circuit and a boost duty cycle sensing and comparison circuit.

The buck duty cycle sensing and comparison circuit is configured to receive a first signal indicative of a buck duty cycle of the buck-boost power converter, and to compare the first signal with a first threshold signal indicative of a buck duty threshold to provide a first mode transition control signal. The buck duty threshold has a first hysteresis. When the buck duty cycle is larger than the buck duty threshold, the first mode transition control signal is configured to regulate the buck-boost power converter to transit from the buck mode to the buck-boost mode and meanwhile to regulate the buck duty threshold to decrease to a second buck duty threshold with a decrement equals to the first hysteresis. When the buck duty cycle is smaller than the second buck duty threshold, the first mode transition control signal is configured to regulate the buck-boost power converter to transit from the buck-boost mode to the buck mode and meanwhile to regulate the buck duty threshold to restore from the second buck duty threshold to the buck duty threshold.

The boost duty cycle sensing and comparison circuit is configured to receive a second signal indicative of a boost duty cycle of the buck-boost power converter, and compare the second signal with a second threshold signal indicative of a boost duty threshold to provide a second mode transition control signal. The boost duty threshold has a second hysteresis. When the boost duty cycle is larger than the boost duty threshold, the second mode transition control signal is configured to regulate the buck-boost power converter to transit from the buck-boost mode to the boost mode, and meanwhile to regulate the boost duty threshold to decrease to a second boost duty threshold with a decrement equals to the second hysteresis. When the boost duty cycle is smaller than the second boost duty threshold, the second mode transition control signal is configured to regulate the buck-boost power converter to transit from the boost mode to the buck-boost mode, and meanwhile to regulate the boost duty threshold to restore from the second boost duty threshold to the boost duty threshold.

There has also been provided, in accordance with an embodiment of the present disclosure, a buck-boost power converter. The buck-boost power converter may comprise a switch module including a first switch pair and a second switch pair, wherein the first switch pair comprising a first power switch and a second power switch coupled in series between an input port and a reference ground, and wherein the second switch pair comprising a third power switch and a fourth power switch coupled in series between an output port and the reference ground. The buck-boost power converter further comprises the mode transition control module to regulate the buck-boost power converter to transit between a buck mode and a buck-boost mode and between the buck-boost mode and a boost mode.

The buck-boost power converter may further comprise a control circuit configured to receive a first feedback signal indicative of an output voltage of the buck-boost power converter, a second feedback signal indicative of a switching current flowing through the switch module, a reference signal indicative of a desired value of the output voltage and a system clock signal. The control circuit is further configured to provide a first control signal, a second control signal, a third control signal and a fourth control signal respectively to the first power switch, the second power switch, the third power switch and the fourth power switch at least based on the first feedback signal, the second feedback signal, the reference signal and the system clock signal, wherein the first control signal and the second control signal are logically complementary and are respectively configured to control the first power switch and the second power switch to conduct ON and OFF switching, and wherein a fraction of an ON time of the first power switch to an entire switching cycle of the first power switch and the second power switch is referred to as a buck duty cycle, and wherein the third control signal and the fourth control signal are logically complementary and are respectively configured to control the third power switch and the fourth power switch to conduct ON and OFF switching, and wherein a fraction of an ON time of the third power switch to an entire switching cycle of the third power switch and the fourth power switch is referred to as a boost duty cycle.

In accordance with an exemplary embodiment, in the buck mode, the buck-boost power converter is regulated to operate with buck cycles continuously, wherein in each of the buck cycles, the first power switch and the second power switch are controlled to conduct ON and OFF switching complementarily, while the third power switch is maintained OFF and the fourth power switch is maintained ON. In the boost mode, the buck-boost power converter is regulated to operate with boost cycles continuously, wherein in each of the boost cycles, the third power switch and the fourth power switch are controlled to conduct ON and OFF switching complementarily, while the first power switch is maintained ON and the second power switch is maintained OFF. In the buck-boost mode, the buck-boost power converter is regulated to operate with a buck cycle and a boost cycle in turn switching cycle by switching cycle.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

The use of the same reference label in different drawings indicates the same or like components or structures with substantially the same functions for the sake of simplicity.

DETAILED DESCRIPTION

Various embodiments of the present invention will now be described. In the following description, some specific details, such as example circuits and example values for these circuit components, are included to provide a thorough understanding of embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
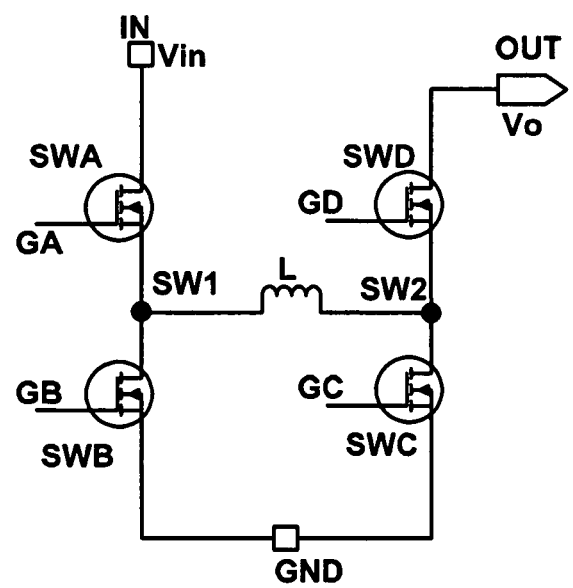
FIG. 1 illustrates a topology 10 of the power switches of a conventional buck-boost power converter.

FIG. 1 illustrates a schematic diagram of a buck-boost power converter 100 and a control circuit 108 in accordance with an exemplary embodiment of the present invention. The buck-boost power converter 100 may be configured to receive an input voltage Vin at an input port IN and to provide an output voltage Vo and an output current Io for supplying a load at an output port OUT. The buck-boost power converter 100 may comprise a switch module, e.g. including a first power switch SWA, a second power switch SWB, a third power switch SWC and a fourth power switch SWD. The switch m having a first terminal coupled to the input port IN, a second terminal coupled to the output port OUT, and a control terminal configured to receive a control signal, the switch module may have a first terminal coupled to the input port IN, a second terminal coupled to the output port OUT, and a plurality of control terminals (e.g. a first control terminal GA, a second control terminal GB, a third control terminal GC and a fourth control terminal GD illustrated in FIG. 2) configured to respectively receive a plurality of control signals (e.g. a first control signal DR1, a second control signal DR2, a third control signal DR3 and a fourth control signal DR4 illustrated in FIG. 2). The switch module is configured to conduct ON and OFF switching based on the plurality of control signals so as to convert the input voltage Vin into the output voltage Vo. The buck-boost power converter 100 may further comprise a control circuit 108 configured to detect/receive a first feedback signal Vfb indicative of the output voltage Vo, a second feedback signal Vcs indicative of the output current Io and a reference signal Vref indicative of a desired value of the output voltage Vo. The control circuit 108 is configured to provide the plurality of control signals (e.g. including the first control signal DR1, the second control signal DR2, the third control signal DR3 and the fourth control signal DR4 illustrated in FIG. 2) to the switch module at least partially based on the first feedback signal Vfb, the second feedback signal Vcs and the reference signal Vref.

Figure 2:
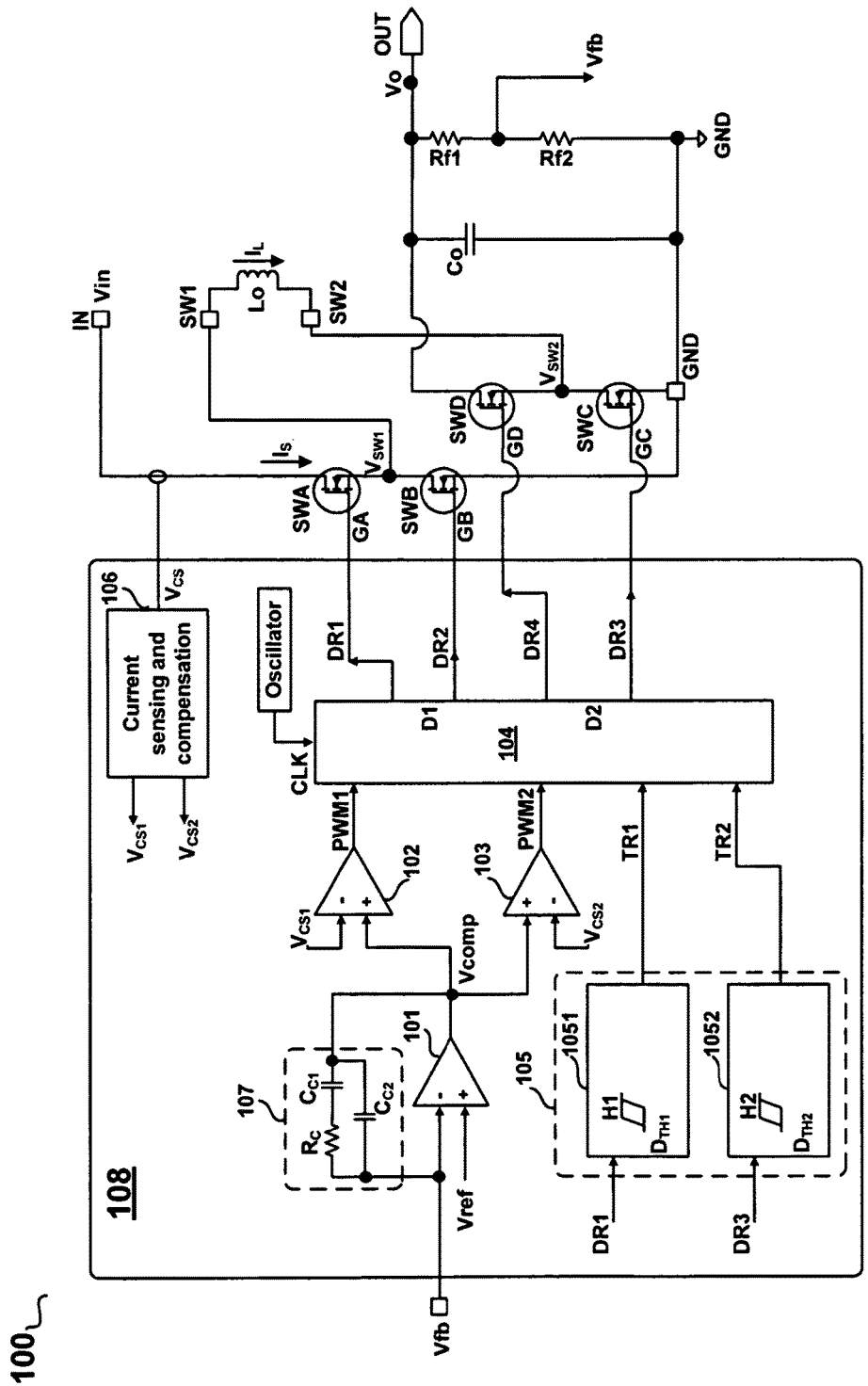
FIG. 2 illustrates a schematic diagram of a buck-boost power converter 100 and a control circuit 108 in accordance with an exemplary embodiment of the present invention.

In accordance with an exemplary embodiment of the present invention, still referring to FIG. 2, the switch module of the buck-boost power converter 100 may have a topology comprising a first power switches SWA and a second power switch SWB coupled in series between the input port IN and a reference ground GND, and a third power switch SWC and a fourth power switch SWD coupled in series between the output pert OUT and the reference ground GND, wherein the first power switch SWA and the second power switch SWB have a common connection SW1 referred to as a first switching node SW1, and the third power switch SWC and the fourth power switch SWD have a common connection SW2 referred to as a second switching node SW2. In an exemplary embodiment, an inductive energy storage component Lo is coupled between the first switching node SW1 and the second switching node SW2. In an exemplary embodiment, the first to fourth power switches SWA, SWB, SWC and SWD may comprise controllable switching components, such as metal oxide semiconductor field effect transistors (MOSFETs) as shown in FIG. 2. The first to fourth power switches SWA, SWB, SWC and SWD may respectively have their own control terminals, such as the first control terminal GA, a second control terminal GB, a third control terminal GC and a fourth control terminal GD illustrated in FIG. 2, to respectively receive the first control signal DR1, the second control signal DR2, the third control signal DR3 and the fourth control signal DR4.

In accordance with an exemplary embodiment of the present invention, the control circuit 108 adopts peak current control pulse width modulation mode to control the ON and OFF switching of the switch module of the buck-boost power converter 100. In an embodiment, the control circuit 108 is configured to at least provide the first control signal DR1, the second control signal DR2, the third control signal DR3 and the fourth control signal DR4 respectively to the first power switch SWA, the second power switch SWB, the third power switch SWC and the fourth power switch SWD. The first power switch SWA and the second power switch SWB form a first switch pair (also referred to as a buck switch pair). The third power switch SWC and the fourth power switch SWD form a second switch pair (also referred to as a boost switch pair). The control circuit 108 is configured to control the first switch pair and the second switch pair to conduct ON and OFF switching independently. The control circuit 108 regulates the buck-boost converter 100 to at least operate in one of the buck mode, the boost mode and the buck-boost mode according to the relative value of the input voltage Vin and the output voltage Vo.

In accordance with an exemplary embodiment of the present invention, the buck-boost power converter 100 is regulated to operate in the buck mode when the input voltage Vin is higher than the output voltage Vo. In the buck mode, the control circuit 108 is configured to regulate the first switch pair to conduct ON and OFF switching, and to regulate the third power switch SWC and the fourth power switch SWD in the second switch pair to respectively remain OFF and ON. In this situation, the buck-boost power converter 100 actually has a buck type topology. In an embodiment, in the buck mode, the control circuit 108 is configured to regulate the first power switch SWA and the second power switch SWB to switch ON and OFF complementarily, i.e. when the first power switch SWA is switched ON, the second power switch SWB is switched OFF, and vice versa. A fraction of an ON time of the first power switch SWA to an entire switching cycle of the first power switch SWA and the second power switch SWB is referred to as a buck duty cycle, and is labeled by D1 in the present disclosure.

In accordance with an exemplary embodiment of the present invention, the buck-boost power converter 100 is regulated to operate in the buck-boost mode when the input voltage Vin is equal or close to the output voltage Vo. In the buck mode, the control circuit 108 is configured to regulate the first switch pair and the second switch pair to conduct ON and OFF switching independently, and is further configured to control the first switch pair and the second switch pair to operate in turn switching cycle by switching cycle, wherein a switching cycle during which the first switch pair is operated to conduct ON and OFF switching is referred to as a buck switching cycle, and a switching cycle during which the second switch pair is operated to conduct ON and OFF switching is referred to as a boost switching cycle. In an embodiment, during a buck switching cycle, the control circuit 108 is configured to regulate the first power switch SWA and the second power switch SWB in the first switch pair to switch ON and OFF complementarily, and is further configured to regulate the third power switch SWC to remain OFF and the fourth power switch SWD to remain ON. Thus, during the buck switching cycle, when the first power switch SWA is switched ON and the second power switch SWB is switched OFF, the first power switch SWA and the fourth power switch SWD among the four power switches SWA, SWB, SWC and SWD are actually ON, and this situation is referred to as "AD" in the present disclosure. In contrast, when the first power switch SWA is switched OFF and the second power switch SWB is switched ON, the second power switch SWB and the fourth power switch SWD among the four power switches SWA, SWB, SWC and SWD are actually ON, and this situation is referred to as "BD" in the present disclosure. During a boost switching cycle, the control circuit 108 is configured to regulate the third power switch SWC and the fourth power switch SWD in the second switch pair to switch ON and OFF complementarily, and is further configured to regulate the first power switch SWA to remain ON and the second power switch SWB to remain OFF. Thus, during the boost switching cycle, when the third power switch SWC is switched ON and the fourth power switch SWD is switched OFF, the first power switch SWA and the third power switch SWC among the four power switches SWA, SWB, SWC and SWD are actually ON, and this situation is referred to as "AC" in the present disclosure. In contrast, when the third power switch SWC is switched OFF and the fourth power switch SWD is switched ON, the first power switch SWA and the fourth power switch SWD among the four power switches SWA, SWB, SWC and SWD are actually ON, and this situation is referred to as "AD" in the present disclosure.

In accordance with an exemplary embodiment of the present invention, the buck-boost power converter 100 is regulated to operate in the boost mode when the input voltage Vin is lower than the output voltage Vo. In the boost mode, the control circuit 108 is configured to regulate the second switch pair to conduct ON and OFF switching, and to regulate the first power switch SWA and the second power switch SWB in the first switch pair to respectively remain OFF and ON. In this situation, the buck-boost power converter 100 actually has a boost type topology. In an embodiment, in the boost mode, the control circuit 108 is configured to regulate the third power switch SWC and the fourth power switch SWD to switch ON and OFF complementarily, i.e. when the third power switch SWC is switched ON, the fourth power switch SWD is switched OFF, and vice versa. A fraction of an on time of the third power switch SWC to an entire switching cycle of the third power switch SWC and the fourth power switch SWD is referred to as a boost duty cycle, and is labeled by D2 in the present disclosure.

In accordance with an embodiment of the present invention, the control circuit 108 is configured to control the buck-boost power converter 100 to automatically transit smoothly between the buck mode and the buck-boost mode, and between the buck-boost mode and the boost mode.

The control circuit 108 can regulate the output voltage Vo through regulating the buck duty cycle D1 and the boost duty cycle D2. When using the peak current control pulse width modulation mode, the second feedback signal Vcs fed to the control circuit 108 may be obtained by sensing a switching current flowing through the first power switch SWA or by sensing an inductor current IL flowing through the inductive energy storage component Lo. Thus, the second feedback signal Vcs is proportional to the switching current $I_{HS}$ or to the inductor current IL and contain an information of a peak current value of the switching current $I_{HS}$ or of the inductor current IL. Since the output current Io can be considered as an average of the switching current $I_{HS}$ or of the inductor current IL. Thus, the second feedback signal Vcs obtained by sensing the switching current $I_{HS}$ or the inductor current IL is actually indicative of the output current Io.

In accordance with an embodiment of the present invention, the buck-boost power converter 100 may further comprise a capacitive energy storage component Co coupled between the output port OUT and the reference ground GND. The capacitive energy storage component Co is configured to filter the output signals from the switch module, e.g. to filter a first switching signal $V_{SW1}$ output at the first switching node SW1 and a second switching signal $V_{SW2}$ output at the second switching node SW2 so as to smooth the output voltage Vo.

In accordance with an embodiment of the present invention, the buck-boost power converter 100 may further comprise a feedback circuit coupled to the output port OUT and configured to detect the output voltage Vo so as to provide the first feedback signal Vfb. In FIG. 2, the feedback circuit is illustrated to comprise a first feedback resistor Rf1 and a second feedback resistor Rf2 connected in series between the output port OUT and the reference ground GND. The first feedback signal Vfb is provided from the common connection of the first feedback resistor Rf1 and the second feedback resistor Rf2. In other embodiments, the feedback circuit may comprise other circuit elements. In certain embodiment, the power converter 100 may not comprise the feedback circuit and the output voltage Vo may be provided as the feedback signal VFB.

In the following, more detailed descriptions will be provided to the buck-boost power converter 100 and the control circuit 108 with reference to FIG. 2 through FIG. 13.

In accordance with an embodiment of the present invention, the control circuit 108 of the buck-boost power converter 100 may comprise an operational amplifier 101 configured to receive the first feedback signal Vfb and the reference signal Vref respectively, and further configured to conduct operation to the first feedback signal Vfb and the reference signal Vref to provide an amplified difference signal $V_{COMP}$ indicative of a difference between the first feedback signal Vfb and the reference signal Vref.

Figure 6:
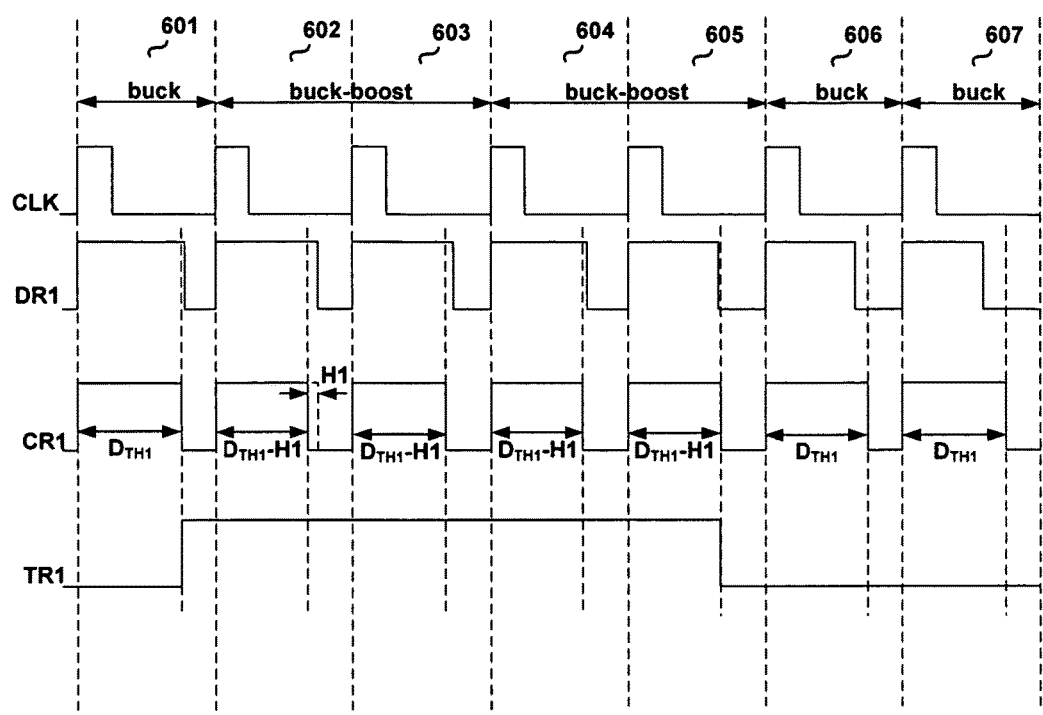
FIG. 6 illustrates an operating waveform diagram of a buck duty cycle sensing and comparison circuit 1051 of the buck-boost power converter 100 in accordance with an embodiment of the present invention.
Figure 8:
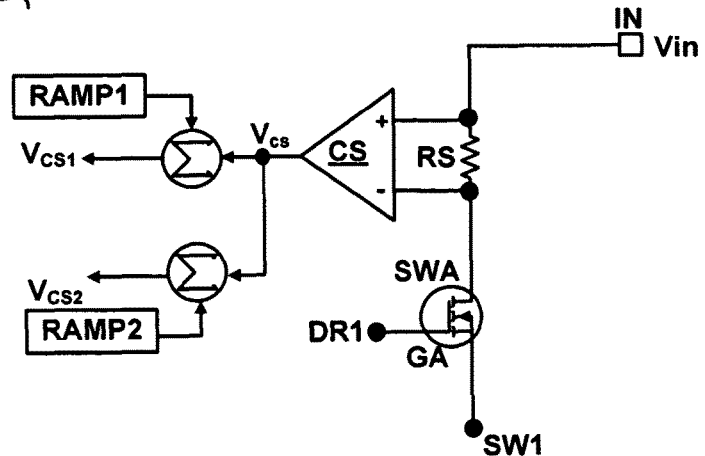
FIG. 8 illustrates a schematic diagram of a current sensing and compensation module 106 of the buck-boost power converter 100 in accordance with an embodiment of the present invention.

The control circuit 108 may further comprise a current sensing and compensation module 106 configured to sense the switching current $I_{HS}$ or the inductor current IL to generate the second feedback signal Vcs, and further configured to compensate the second feedback signal Vcs by slope compensation scheme to generate a first current sensing signal $V_{CS1}$ and a second current sensing signal $V_{CS2}$. The first current sensing signal $V_{CS1}$ is indicative of the inductor current IL during the buck-boost power converter 100 is operated in the buck mode/buck cycle while the second current sensing signal $V_{CS2}$ is indicative of the inductor current IL during the buck-boost power converter 100 is operated in the boost mode/boost cycle. FIG. 8 illustrates a schematic diagram of a current sensing and compensation module 106 in accordance with an embodiment of the present invention. In this example, the current sensing and compensation module 106 is illustrated to generate the second feedback signal Vcs by sensing the switching current $I_{HS}$ flowing through the first power switch SWA. A current sensing resistor RS and a current sensing amplifier CS may be used to implement this function, as shown in FIG. 6, the current sensing resistor RS is coupled in series with the first power switch SWA, and a first input terminal and a second input terminal of the current sensing amplifier CS are respectively coupled to a first terminal and a second terminal of the current sensing resistor RS. The current sensing amplifier CS outputs the second feedback signal Vcs. One of ordinary skill in the art should understand that this is not intended to be limiting, other circuits/elements may be used to fulfill the current sensing function. The current sensing and compensation module 106 may further be configured to receive a first slope compensation signal RAMP1 and a second slope compensation signal RAMP2 to respectively compensate the second feedback signal Vcs.

Figure 9:
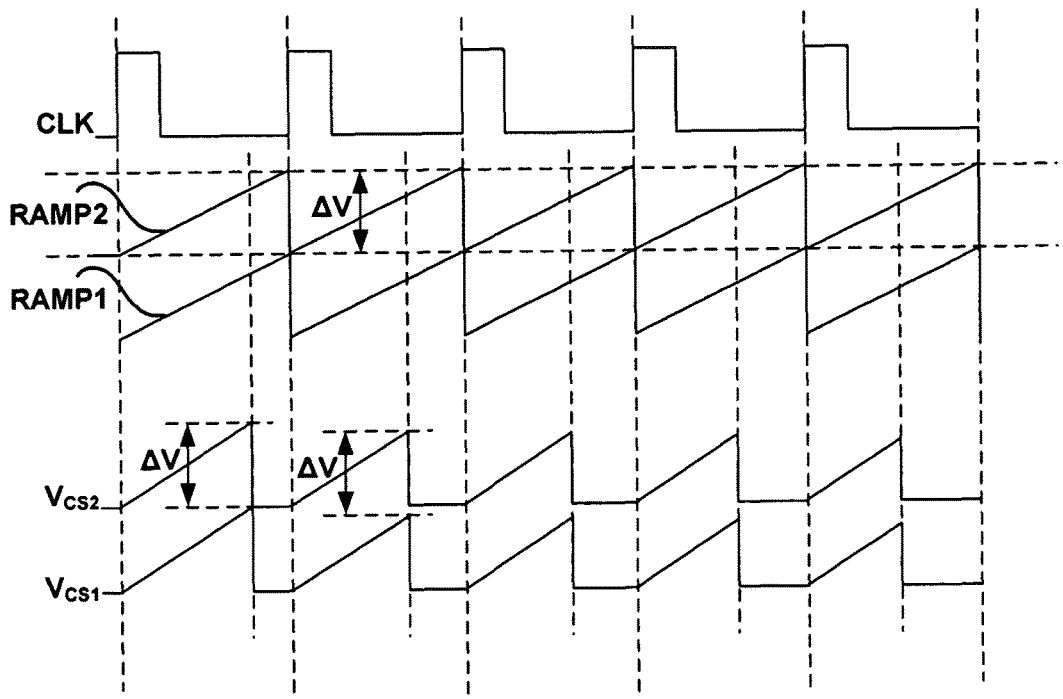
FIG. 9 illustrates waveform diagrams of a first compensation signal and a second compensation signal fed to the current sensing and compensation module 106 as well as waveform diagrams of a first current sensing signal and a second current sensing signal output by the current sensing and compensation module 106 in accordance with an embodiment of the present invention.

In an embodiment as shown in FIG. 9, the second slope compensation signal RAMP2 may be generated by adding a predetermined bias voltage ΔV to the first slope compensation signal RAMP1 to make a peak value of the first slope compensation signal RAMP1 equal to a valley value of the second slope compensation signal RAMP2. The first slope compensation signal RAMP1 and the second slope compensation signal RAMP2 do not overlay with each other. In this case, the predetermined bias voltage ΔV may be considered as equal to amplitude of the first slope compensation signal RAMP1. One of ordinary skill in the art should understand that the illustration of slope and amplitude in FIG. 9 are only for illustrative purpose and are not drawn to scale.

Turning back to FIG. 8, the current sensing and compensation module 106 is configured to compensate the second feedback signal Vcs respectively by the first slope compensation signal RAMP1 and the second slope compensation signal RAMP2 to respectively generate the first current sensing signal $V_{CS1}$ and the second current sensing signal $V_{CS2}$. In an embodiment, as shown in FIG. 8, the compensation may be realized by an adder, i.e. respectively adding the first slope compensation signal RAMP1 and the second slope compensation signal RAMP2 to the second feedback signal Vcs to respectively generate the first current sensing signal $V_{CS1}$ and the second current sensing signal $V_{CS2}$. Thus, the second current sensing signal $V_{CS2}$ can also be considered as obtained by adding the predetermined bias voltage ΔV to the first current sensing signal $V_{CS1}$.

Turning back to FIG. 2, the control circuit 108 may further comprise a buck cycle pulse width modulation module 102 and a boost cycle pulse width modulation module 103. The buck cycle pulse width modulation module 102 is configured to respectively receive the amplified difference signal Vcomp and the first current sensing signal $V_{CS1}$, and to compare the first current sensing signal $V_{CS1}$ with the amplified difference signal Vcomp to generate a first pulse width modulation signal PWM1. The boost cycle pulse width modulation module 103 is configured to respectively receive the amplified difference signal Vcomp and the second current sensing signal $V_{CS2}$, and to compare the second current sensing signal $V_{CS2}$ with the amplified difference signal Vcomp to generate a second pulse width modulation signal PWM2.

The control circuit 108 may further comprise a logic control module 104. The logic control module 104 may be configured to at least receive the first pulse width modulation signal PWM1, the second pulse width modulation signal PWM2 and a clock signal CLK, and further be configured to provide the first control signal DR1, the second control signal DR2, the third control signal DR3 and the fourth control signal DR4 at least based on the first pulse width modulation signal PWM1, the second pulse width modulation signal PWM2 and the clock signal CLK. The clock signal CLK may be generated from an oscillator for example. In an embodiment, the first control signal DR1 and the second control signal DR2 may be logically complementary, i.e. when the first control signal DR1 has a high logic level, the second control signal DR2 has a low logic level, and vice versa. The first control signal DR1 and the second control signal DR2 are respectively configured to control the first power switch SWA and the second power switch SWB in the first switch pair. The third control signal DR3 and the fourth control signal DR4 may also be logically complementary, i.e. when the third control signal DR3 has a high logic level, the fourth control signal DR4 has a low logic level, and vice versa. The third control signal DR3 and the fourth control signal DR4 are respectively configured to control the third power switch SWC and the fourth power switch SWD in the second switch pair. In an embodiment, during the buck mode/buck cycle, the first pulse width modulation signal PWM1 is configured to trigger the first control signal DR1 to switch the first power switch SWA OFF, and the clock signal CLK is configured to trigger the first control signal DR1 to switch the first power switch SWA ON. During the boost mode/boost cycle, the second pulse width modulation signal PWM2 is configured to trigger the third control signal DR3 to switch the third power switch SWC OFF, and the clock signal CLK is configured to trigger the third control signal DR3 to switch the third power switch SWC ON.

The control circuit 108 may further comprise a mode transition control module 105. The mode transition control module 105 may be configured to sense the buck duty cycle D1 and the boost duty cycle D2, to compare the sensed buck duty cycle D1 and the sensed boost duty cycle D2 respectively with a buck duty threshold $D_{TH1}$ and a boost duty threshold $D_{TH2}$, and to regulate the buck-boost power converter 100 to conduct mode transition based on the comparison result. In an exemplary embodiment, the mode transition control module 105 may comprise a buck duty cycle sensing and comparison circuit 1051 and a boost duty cycle sensing and comparison circuit 1052. The buck duty cycle sensing and comparison circuit 1051 is configured to detect the buck duty cycle D1, and compare a first signal indicative of the buck duty cycle D1 with a first threshold signal indicative of the buck duty threshold $D_{TH1}$ to provide a first mode transition control signal TR1. If the buck duty cycle D1 is larger than the buck duty threshold $D_{TH1}$, the first mode transition control signal TR1 is configured to control the buck-boost power converter 100 to transit from the buck mode to the buck-boost mode. If the buck duty cycle D1 is smaller than the buck duty threshold $D_{TH1}$, the first mode transition control signal TR1 is configured to control the buck-boost power converter 100 to transit from the buck-boost mode to the buck mode. The boost duty cycle sensing and comparison circuit 1052 is configured to detect the boost duty cycle D2, and compare a second signal indicative of the boost duty cycle D2 with a second threshold signal indicative of the boost duty threshold $D_{TH2}$ to provide a second mode transition control signal TR2. If the boost duty cycle D2 is larger than the boost duty threshold $D_{TH2}$, the second mode transition control signal TR2 is configured to control the buck-boost power converter 100 to transit from the buck-boost mode to the boost mode. If the boost duty cycle D2 is smaller than the boost duty threshold $D_{TH2}$, the second mode transition control signal TR2 is configured to control the buck-boost power converter 100 to transit from the boost mode to the buck-boost mode.

In accordance with an exemplary embodiment of the present invention, the buck duty threshold $D_{TH1}$ may include a first hysteresis H1. In this circumstance, if the buck duty cycle D1 is larger than the buck duty threshold $D_{TH1}$, the first mode transition control signal TR1 is configured to regulate the buck-boost power converter 100 to transit from the buck mode to the buck-boost mode, and meanwhile to regulate the buck duty threshold $D_{TH1}$ to decrease to a second buck duty threshold ($D_{TH1}$–H1), wherein the decrement equals to the first hysteresis. The first mode transition control signal TR1 is further configured to regulate the buck-boost power converter 100 to transit from the buck-boost mode to the buck mode once the buck duty cycle D1 is decreased to be smaller than the second buck duty threshold ($D_{TH1}$–H1), and meanwhile to regulate the buck duty threshold to restore to the original threshold value $D_{TH1}$. With this scheme, un-desired back and forth transitions between the buck mode and the buck-boost mode resulted from false triggering may be prevented, improving the stability and reliability of the buck-boost power converter 100.

Figure 3:
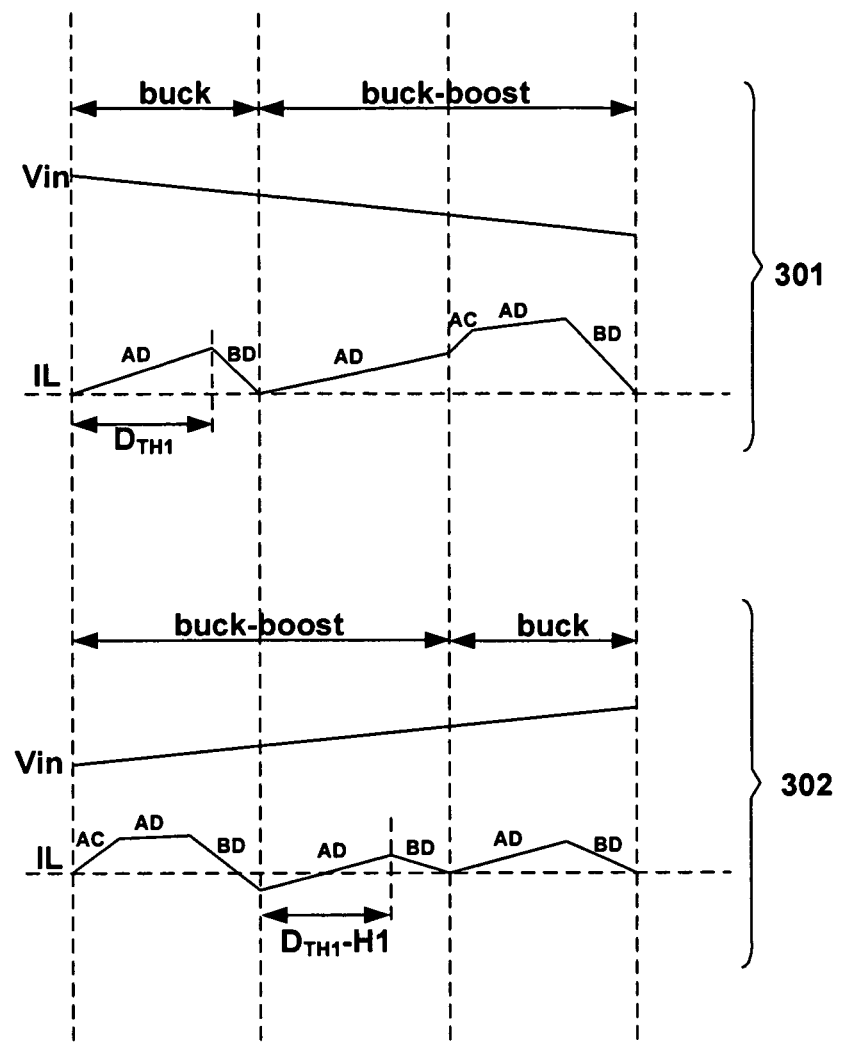
FIG. 3 illustrates a waveform diagram of an inductor current IL flowing through an inductive energy storage component Lo of the buck-boost power converter 100 when the buck-boost power converter 100 transits between buck mode and buck-boost mode in accordance with an embodiment of the present invention.

FIG. 3 illustrates a waveform diagram of the inductor current IL flowing through the inductive energy storage component Lo of the buck-boost power converter 100 when the buck-boost power converter 100 transits between buck mode and buck-boost mode in accordance with an embodiment of the present invention. The first group of waveforms 301 illustrate the inductor current IL immediately before and after the buck-boost power converter is transited from the buck mode to the buck-boost mode. As shown in FIG. 3, in the buck mode, with the input voltage Vin decreasing, the input voltage Vin is more and more close to the output voltage Vo until the buck duty cycle D1 reaches the buck duty threshold $D_{TH1}$, which indicates that the buck-boost power converter 100 may not be able to provide enough energy to the load should the buck-boost power converter 100 continues operating in the buck mode. For instance, the buck duty threshold $D_{TH1}$ may be set to a maximum allowable buck duty cycle value when the buck-boost power converter 100 operates in the buck mode. In an embodiment, the buck duty threshold $D_{TH1}$ may be set to 95%. And of course, this is just to provide an example and is not intended to be limiting, buck duty threshold $D_{TH1}$ may be set to other suitable duty cycle values in other embodiments. Once the buck duty cycle D1 is increased to reach the buck duty threshold $D_{TH1}$, it indicates that the buck-boost power converter 100 needs to transit from the buck mode to the buck-boost mode to meet the energy supply required by the load. Thus, during the buck cycle immediately after the buck-boost power converter 100 has transited to the buck-boost mode, the first power switch SWA may need to be ON throughout the entire switching cycle (see the second "AD" segment of the inductor current IL waveform in the first group of waveforms 301 in FIG. 3). In the immediately subsequent boost cycle, the third power switch SWC and the fourth power switch SWD conduct one switching cycle of ON and OFF switching (see the third "AD" segment of the inductor current IL waveform in the first group of waveforms 301 in FIG. 3). Subsequently, following the boost cycle, the buck-boost power converter 100 should be operated in a buck cycle again to switch ON the second power switch SWB (see the second "BD" segment of the inductor current IL waveform in the first group of waveforms 301 in FIG. 3) so as to discharge the inductor current IL to meet the volt-second balance principle. After that, the buck-boost power converter 100 will operate in the buck-boost mode stably, i.e., to operate in the buck cycle (including a "BD" and an "AD") and the boost cycle (including an "AC" and an "AD") in turn switching cycle by switching cycle.

The second group of waveforms 301 illustrate the inductor current IL immediately before and after the buck-boost power converter is transited from the buck-boost mode to the buck mode. As shown in FIG. 3, in the buck-boost mode, with the input voltage Vin increasing, the input voltage Vin becomes larger than the output voltage Vo until the buck duty cycle D1 falls to be smaller than the second buck duty threshold ($D_{TH1}$–H1), which indicates that the energy provided by the buck-boost power converter 100 to the load exceeds the requirement should the buck-boost power converter 100 continues operating in the buck-boost mode. For instance, the second buck duty threshold ($D_{TH1}$–H1) may be set to a minimum allowable buck duty cycle value when the buck-boost power converter 100 operates in the buck-boost mode. In an embodiment, the second buck duty threshold ($D_{TH1}$–H1) may be set to 80%. And of course, this is just to provide an example and is not intended to be limiting, second buck duty threshold ($D_{TH1}$–H1) may be set to other suitable duty cycle values in other embodiments. Once the buck duty cycle D1 is decreased to be smaller than the second buck duty threshold ($D_{TH1}$–H1), it indicates that the buck-boost power converter 100 needs to transit from the buck-boost mode to the buck mode to adjust the energy supplied to the load to match with the energy required by the load. After the mode transition, the buck-boost power converter 100 will operate in the buck mode stably, i.e. to operate in the buck cycle (including an "AD" and a "BD") continuously.

In accordance with an exemplary embodiment of the present invention, the boost duty threshold $D_{TH2}$ may include a second hysteresis H2. In this circumstance, if the boost duty cycle D2 is larger than the boost duty threshold $D_{TH2}$, the second mode transition control signal TR2 is configured to regulate the buck-boost power converter 100 to transit from the buck-boost mode to the boost mode, and meanwhile to regulate the boost duty threshold $D_{TH2}$ to decrease to a second boost duty threshold ($D_{TH2}$–H2), wherein the decrement equals to the second hysteresis H2. And thus, the second mode transition control signal TR2 is further configured to regulate the buck-boost power converter 100 to transit from the boost mode to the buck-boost mode if the boost duty cycle D2 is decreased to be smaller than the second boost duty threshold ($D_{TH2}$–H2), and meanwhile to regulate the boost duty threshold to restore to the original threshold value $D_{TH2}$. With this scheme, un-desired back and forth transitions between the buck-boost mode and the boost mode resulted from false triggering may be prevented, improving the stability and reliability of the buck-boost power converter 100.

Figure 4:
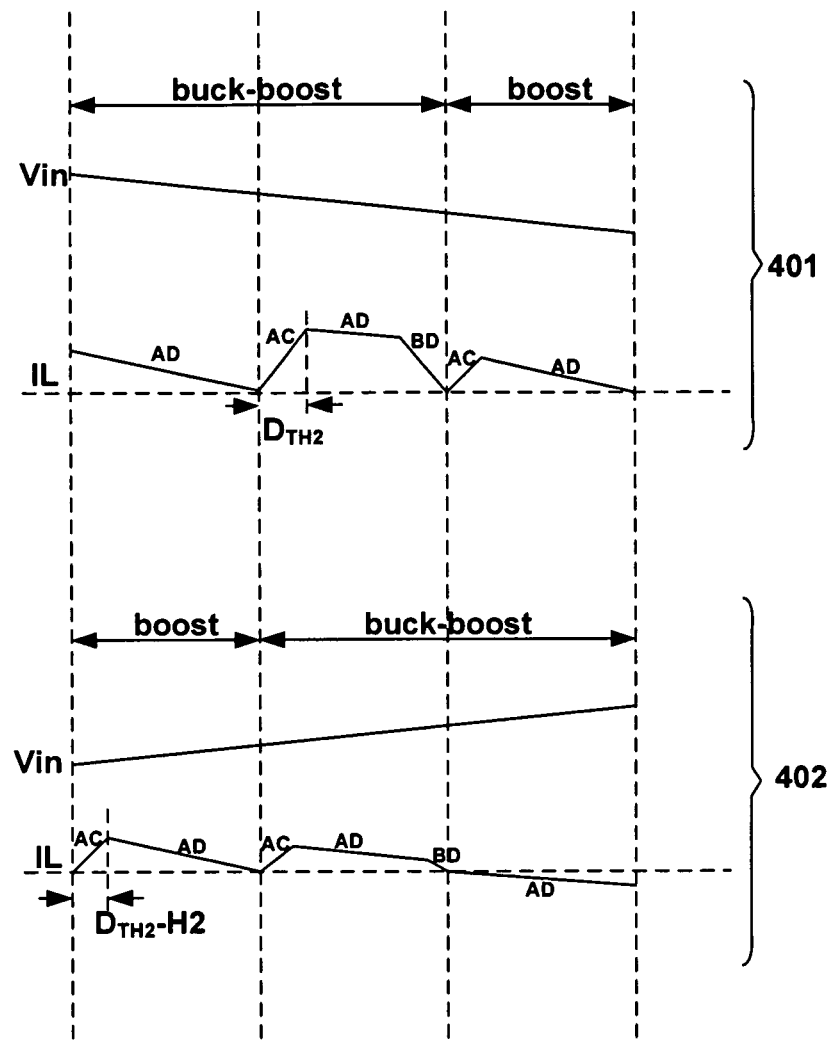
FIG. 4 illustrates a waveform diagram of the inductor current IL flowing through the inductive energy storage component Lo of the buck-boost power converter 100 when the buck-boost power converter 100 transits between buck-boost mode and boost mode in accordance with an embodiment of the present invention.

FIG. 4 illustrates a waveform diagram of the inductor current IL flowing through the inductive energy storage component Lo of the buck-boost power converter 100 when the buck-boost power converter 100 transits between buck-boost mode and boost mode in accordance with an embodiment of the present invention. The first group of waveforms 401 in FIG. 4 illustrate the inductor current IL immediately before and after the buck-boost power converter 100 is transited from the buck-boost mode to the boost mode. As shown in FIG. 4, in the buck-boost mode, with the input voltage Vin decreasing further, the input voltage Vin becomes smaller than the output voltage Vo until the boost duty cycle D2 reaches the boost duty threshold $D_{TH2}$, which indicates that the buck-boost power converter 100 may not be able to provide enough energy to the load should the buck-boost power converter 100 continues operating in the buck-boost mode. For instance, the boost duty threshold $D_{TH2}$ may be set to a maximum allowable boost duty cycle value when the buck-boost power converter 100 operates in the buck-boost mode. In an embodiment, the boost duty threshold $D_{TH2}$ may be set to 30%. And of course, this is just to provide an example and is not intended to be limiting, boost duty threshold $D_{TH2}$ may be set to other suitable duty cycle values in other embodiments. Once the boost duty cycle D2 is increased to reach the boost duty threshold $D_{TH2}$, it indicates that the buck-boost power converter 100 needs to transit from the buck-boost mode to the boost mode to meet the energy supply required by the load. Thus, after the buck-boost power converter 100 has transited to the boost mode, no more buck cycles (illustrated by the "BD" segments of the inductor current IL waveform in the first group of waveforms 401 in FIG. 4) are needed, and the buck-boost power converter 100 will operate in the boost mode stably, i.e. to operate in the boost cycle (including an "AC" and an "AD") continuously.

The second group of waveforms 402 in FIG. 4 illustrate the inductor current IL immediately before and after the buck-boost power converter is transited from the boost mode to the buck-boost mode. As shown in FIG. 4, in the boost mode, with the input voltage Vin increasing further, the input voltage Vin becomes more and more close to the output voltage Vo until the boost duty cycle D2 falls to be smaller than the second boost duty threshold ($D_{TH2}$-H2), which indicates that the energy provided by the buck-boost power converter 100 to the load exceeds the requirement should the buck-boost power converter 100 continues operating in the boost mode. For instance, the second boost duty threshold ($D_{TH2}$-H2) may be set to a minimum allowable boost duty cycle value when the buck-boost power converter 100 operates in the boost mode. In an embodiment, the second boost duty threshold ($D_{TH2}$-H2) may be set to 10%. And of course, this is just to provide an example and is not intended to be limiting, the second boost duty threshold ($D_{TH2}$-H2) may be set to other suitable duty cycle values in other embodiments. Once the boost duty cycle D2 is decreased to be smaller than the second boost duty threshold ($D_{TH2}$-H2), it indicates that the buck-boost power converter 100 needs to transit from the boost mode to the buck-boost mode to adjust the energy supplied to the load to match with the energy required by the load. Thus, immediately after the buck-boost power converter 100 has transited from the boost mode to the buck-boost mode, the buck-boost power converter 100 may need to operate in a buck cycle to switch the second power switch SWB ON (see the "BD" segment of the inductor current IL waveform in the second group of waveforms 402 in FIG. 4) immediately after a boost cycle (see the second "AC" segment and the second "AD" segment of the inductor current IL waveform in the second group of waveforms 402 in FIG. 4). After that, the buck-boost power converter 100 will operate in the buck-boost mode stably, i.e. to operate in the buck cycle (including a "BD" and an "AD") and the boost cycle (including an "AC" and an "AD") in turn switching cycle by switching cycle.

Figure 5:
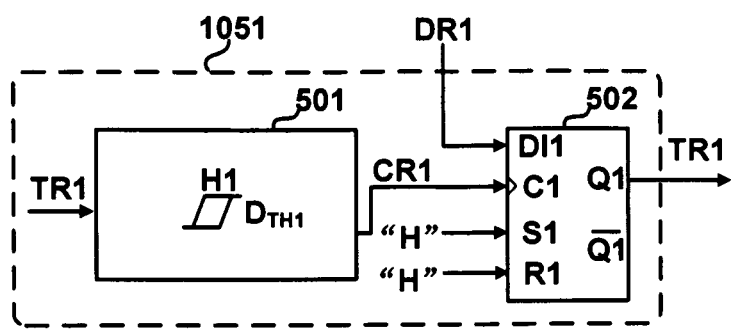
FIG. 5 illustrates a schematic diagram of a mode transition control module 105 in accordance with an embodiment of the present invention.
Figure 5:
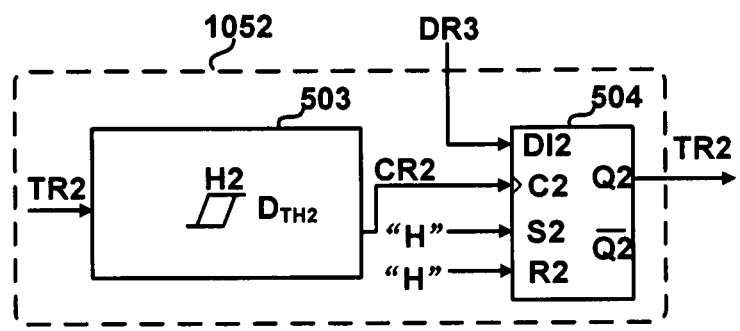

FIG. 5 illustrates a schematic diagram of a mode transition control module 105 in accordance with an embodiment of the present invention. The buck duty cycle sensing and comparison circuit 1051 is illustrated to comprise a first reference signal generation circuit 501 and a first D flip-flop 502. The first reference signal generation circuit 501 has an input control terminal and an output terminal, wherein the first reference signal generation circuit 501 is configured to receive the first mode transition control signal TR1 at the control input terminal and to provide a first reference pulse signal CR1 at the output terminal, and is further configured to regulate a pulse width of the first reference pulse signal CR1 based on the first mode transition control signal TR1 so that a ratio of the pulse width of the first reference pulse signal CR1 to a period of the first reference pulse signal CR1 equals to the second buck duty threshold ($D_{TH1}$-H1) when the buck duty cycle D1 is larger than the buck duty threshold $D_{TH1}$ and equals to the buck duty threshold $D_{TH1}$ when the buck duty cycle D1 is smaller than the second buck duty threshold ($D_{TH1}$-H1). The first D flip-flop 502 has a first data input terminal DI1, a first clock input terminal C1, a first set terminal S1, a first reset terminal R1, a first non-inverse output terminal Q1 and a first inverse output terminal $\overline{Q1}$, wherein the first data input terminal DI1 is configured to receive the first control signal DR1, the first clock input terminal C1 is configured to receive the first reference pulse signal CR1, the first set terminal S1 and the first reset terminal R1 are coupled to a logic high "H" to make the first D flip-flop 502 operate normally.

FIG. 6 illustrates an operating waveform diagram of the buck duty cycle sensing and comparison circuit 1051 in accordance with an embodiment of the present invention. In the following, the buck duty cycle sensing and comparison circuit 1501 will be further described with reference to FIG. 6. Since a pulse width of the first control signal DR1 can indicate the buck duty cycle D1 and the pulse width of the first reference pulse signal CR1 can indicate the buck duty threshold, comparison of the buck duty cycle D1 to the buck duty threshold $D_{TH1}$ (or to the second buck duty threshold ($D_{TH1}$-H1)) may be implemented by comparing the pulse width of the first control signal DR1 to the pulse width of the first reference pulse signal CR1. As shown in FIG. 6, the first D flip-flop 502 is a clock falling edge triggered flip-flop. As the first reference pulse signal CR1 is provided as a clock signal to the clock input terminal C1 of the first D flip-flop 502, at each falling edge of the first reference pulse signal CR1, the first D flip-flop 502 is triggered and is configured to transmit a data (i.e. a logic state of the first control signal DR1 in the example of FIG. 6) received at the data input terminal DI1 to the non-inverse output terminal Q1 and hold that data at the non-inverse output terminal Q1 until the next falling edge of the first reference pulse signal CR1 comes. In the exemplary embodiment shown in FIG. 6, each of the first control signal DR1, the first reference pulse signal CR1 and the first mode transition control signal TR1 may have a first logic state (e.g. illustrated as a logic high in FIG. 6) and a second logic state (e.g. illustrated as a logic low in FIG. 6), wherein the pulse width of the first control signal DR1 refers to a width of each first logic state pulse of the first control signal DR1 and the pulse width of the first reference pulse signal CR1 also refers to a width of each first logic state pulse of the first reference pulse signal CR1. The first mode transition control signal TR1 is configured to regulate the buck-boost power converter 100 to transit from the buck mode to the buck-boost mode when the first mode transition control signal TR1 changes to the first logic state, and is further configured to regulate the buck-boost power converter 100 to transit from the buck-boost mode to the buck mode when the first mode transition control signal TR1 changes to the second logic state.

Hypothetically supposing that the buck-boost power converter 100 is operating in the buck mode (see the waveforms during the clock cycle 601 illustrated in FIG. 6 of a system clock signal CLK of the buck-boost power converter 100), the first mode transition control signal TR1 is at the second logic state (illustrated as a logic low in FIG. 6). If the pulse width of the first control signal DR1 is larger than the pulse width of the first reference pulse signal CR1, once a falling edge of the first reference pulse signal CR1 comes, the first control signal DR1 is still at the first logic state (illustrated as a logic high in FIG. 6), and thus the first D flip-flop 502 is triggered by the falling edge of the first reference pulse signal CR1 and transmits the first logic state (illustrated as a logic high in FIG. 6) of the first control signal DR1 to the first non-inverse output terminal Q1, resulting in the first mode transition control signal TR1 changing from the second logic state (illustrated as a logic low in FIG. 6) to the first logic state (illustrated as a logic high in FIG. 6). In this circumstance, the change of the first mode transition control signal TR1 from the second logic state to the first logic state indicates that the buck duty cycle D1 has exceeded the buck duty threshold $D_{TH1}$. Accordingly, the first mode transition control signal TR1 is configured to control the buck-boost power converter 100 to transit from the buck mode to the buck-boost mode (see the waveforms during the clock cycles 601 and 603 of the system clock signal CLK illustrated in FIG. 6). Meanwhile, the first reference pulse signal generation circuit 501 is configured to regulate the pulse width of the first reference pulse signal CR1 to decrease in response to the first logic state of the first mode transition control signal TR1, so that the ratio of the pulse width of the first reference pulse signal CR1 to the period of the first reference pulse signal CR1 is decreased to be equal to the second buck duty threshold ($D_{TH1}$-H1).

Hypothetically supposing that the buck-boost power converter 100 is operating in the buck-boost mode (see the waveforms during the clock cycles 602-605 of the system clock signal CLK illustrated in FIG. 6), the first mode transition control signal TR1 is at the first logic state (illustrated as a logic high in FIG. 6). If the input voltage Vin increases, with the increasing of the input voltage Vin, at a buck cycle of the buck-boost mode, should the pulse width of the first control signal DR1 becomes smaller than the pulse width of the first reference pulse signal CR1 (see the waveforms during the clock cycle 605 of the system clock signal CLK illustrated in FIG. 6), once a falling edge of the first reference pulse signal CR1 comes, the first control signal DR1 is still at the second logic state (illustrated as a logic low in FIG. 6), and thus the first D flip-flop 502 is triggered by the falling edge of the first reference pulse signal CR1 and transmits the second logic state (illustrated as a logic low in FIG. 6) of the first control signal DR1 to the first non-inverse output terminal Q1, resulting in the first mode transition control signal TR1 to change from the first logic state (illustrated as a logic high in FIG. 6) to the second logic state (illustrated as a logic low in FIG. 6). In this circumstance, the change of the first mode transition control signal TR1 from the first logic state to the second logic state indicates that the buck duty cycle D1 has become smaller than the second buck duty threshold ($D_{TH1}$-H1). Accordingly, the first mode transition control signal TR1 is configured to control the buck-boost power converter 100 to transit from the buck-boost mode to the buck mode (see the waveforms during the clock cycles 606 and 607 of the system clock signal CLK illustrated in FIG. 6). Meanwhile, the first reference pulse signal generation circuit 501 is configured to regulate the pulse width of the first reference pulse signal CR1 to increase in response to the second logic state of the first mode transition control signal TR1, so that the ratio of the pulse width of the first reference pulse signal CR1 to the period of the first reference pulse signal CR1 is increased to be equal to the buck duty threshold $D_{TH1}$.

Therefore, the buck duty cycle sensing and comparison circuit 1051 can regulate the buck-boost power converter 100 to transit between the buck mode and the buck-boost mode based on comparing the pulse width of the first control signal DR1 with the pulse width the of first reference pulse signal CR1.

The boost duty cycle sensing and comparison circuit 1052 is illustrated to comprise a second reference signal generation circuit 503 and a second D flip-flop 504. The second reference signal generation circuit 503 has an input control terminal and an output terminal, wherein the second reference signal generation circuit 503 is configured to receive the second mode transition control signal TR2 at the control input terminal and to provide a second reference pulse signal CR2 at the output terminal, and is further configured to regulate a pulse width of the second reference pulse signal CR2 based on the second mode transition control signal TR2 so that a ratio of the pulse width of the second reference pulse signal CR2 to a period of the second reference pulse signal CR2 equals to the second boost duty threshold ($D_{TH2}$-H2) when the boost duty cycle D2 is larger than the boost duty threshold $D_{TH2}$ and equals to the boost duty threshold $D_{TH2}$ when the boost duty cycle D2 is smaller than the second boost duty threshold ($D_{TH2}$-H2). The second D flip-flop 504 has a second data input terminal DI2, a second clock input terminal C2, a second set terminal S2, a second reset terminal R2, a second non-inverse output terminal Q2 and a second inverse output terminal $\overline{Q2}$, wherein the second data input terminal DI2 is configured to receive the third control signal DR3, the second clock input terminal C2 is configured to receive the second reference pulse signal CR2, the second set terminal S2 and the second reset terminal R2 are coupled to a logic high "H" to make the second D flip-flop 504 operate normally.

Figure 7:
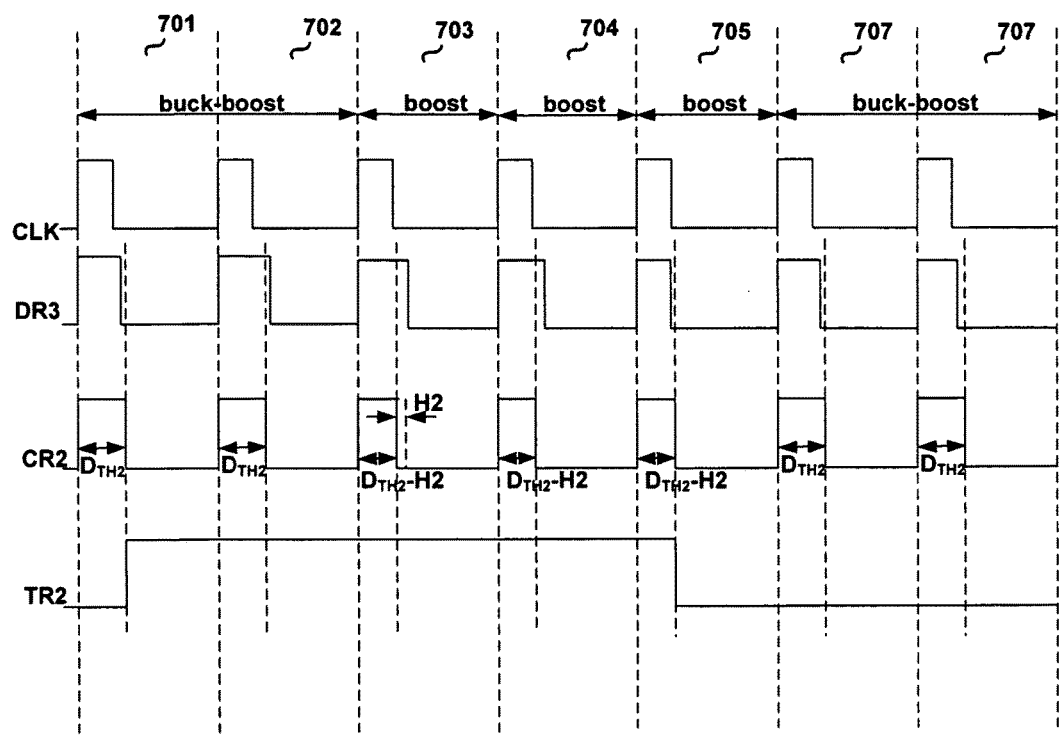
FIG. 7 illustrates an operating waveform diagram of a boost duty cycle sensing and comparison circuit 1052 of the buck-boost power converter 100 in accordance with an embodiment of the present invention.

FIG. 7 illustrates an operating waveform diagram of the boost duty cycle sensing and comparison circuit 1052 in accordance with an embodiment of the present invention. In the following, the boost duty cycle sensing and comparison circuit 1502 will be further described with reference to FIG. 7. Since a pulse width of the third control signal DR3 can indicate the boost duty cycle D2 and the pulse width of the second reference pulse signal CR2 can indicate the boost duty threshold, comparison of the boost duty cycle D2 to the boost duty threshold $D_{TH2}$ (or to the second boost duty threshold ($D_{TH2}$-H2)) may be implemented by comparing the pulse width of the third control signal DR3 to the pulse width of the second reference pulse signal CR2. As shown in FIG. 7, the second D flip-flop 504 is a clock falling edge triggered flip-flop. As the second reference pulse signal CR2 is provided as a clock signal to the clock input terminal C2 of the second D flip-flop 504, at each falling edge of the second reference pulse signal CR2, the second D flip-flop 504 is triggered and is configured to transmit a data (i.e. a logic state of the third control signal DR3 in the example of FIG. 7) received at the second data input terminal DI2 to the second non-inverse output terminal Q2 and hold that data at the second non-inverse output terminal Q2 until the next falling edge of the second reference pulse signal CR2 comes. In the exemplary embodiment shown in FIG. 7, each of the third control signal DR3, the second reference pulse signal CR2 and the second mode transition control signal TR2 may have a first logic state (e.g. illustrated as a logic high in FIG. 7) and a second logic state (e.g. illustrated as a logic low in FIG. 7), wherein the pulse width of the third control signal DR3 refers to a width of each first logic state pulse of the third control signal DR3 and the pulse width of the second reference pulse signal CR2 also refers to a width of each first logic state pulse of the second reference pulse signal CR2. The second mode transition control signal TR2 is configured to regulate the buck-boost power converter 100 to transit from the buck-boost mode to the boost mode when the second mode transition control signal TR2 changes to the first logic state, and is further configured to regulate the buck-boost power converter 100 to transit from the boost mode to the buck-boost mode when the second mode transition control signal TR2 changes to the second logic state.

Hypothetically supposing that the buck-boost power converter 100 is operating in the buck-boost mode (see the waveforms during the clock cycles 701 and 702 of a system clock signal CLK illustrated in FIG. 7 of the buck-boost power converter 100), the second mode transition control signal TR2 is at the second logic state (illustrated as a logic low in FIG. 7). If the pulse width of the third control signal DR3 is larger than the pulse width of the second reference signal CR2, once a falling edge of the second reference pulse signal CR2 comes, the third control signal DR3 is still at the first logic state (illustrated as a logic high in FIG. 7), and thus the second D flip-flop 504 is triggered by the falling edge of the second reference pulse signal CR2 and transmits the first logic state (illustrated as a logic high in FIG. 7) of the third control signal DR3 to the second non-inverse output terminal Q2, resulting in the second mode transition control signal TR2 changing from the second logic state (illustrated as a logic low in FIG. 7) to the first logic state (illustrated as a logic high in FIG. 7). In this circumstance, the change of the second mode transition control signal TR2 from the second logic state to the first logic state indicates that the boost duty cycle D2 has exceeded the boost duty threshold $D_{TH2}$. Accordingly, the second mode transition control signal TR2 is configured to control the buck-boost power converter 100 to transit from the buck-boost mode to the boost mode (see the waveforms during the clock cycles 702 and 703 of the system clock signal CLK illustrated in FIG. 7). Meanwhile, the second reference pulse signal generation circuit 503 is configured to regulate the pulse width of the second reference pulse signal CR2 to decrease in response to the first logic state of the second mode transition control signal TR2, so that the ratio of the pulse width of the second reference pulse signal CR2 to the period of the second reference pulse signal CR2 is decreased to be equal to the second boost duty threshold ($D_{TH2}$-H2).

Hypothetically supposing that the buck-boost power converter 100 is operating in the boost mode (see the waveforms during the clock cycles 703~705 of the system clock signal CLK illustrated in FIG. 7), the second mode transition control signal TR2 is at the first logic state (illustrated as a logic high in FIG. 7). If the input voltage Vin decreases, with the decreasing of the input voltage Vin, should the pulse width of the third control signal DR3 becomes smaller than the pulse width of the second reference signal CR2 (see the waveforms during the clock cycle 705 of the system clock signal CLK illustrated in FIG. 7), once a falling edge of the second reference pulse signal CR2 comes, the third control signal DR3 is still at the second logic state (illustrated as a logic low in FIG. 7), and thus the second D flip-flop 504 is triggered by the falling edge of the second reference pulse signal CR2 and transmits the second logic state (illustrated as a logic low in FIG. 7) of the third control signal DR3 to the second non-inverse output terminal Q2, resulting in the second mode transition control signal TR2 to change from the first logic state (illustrated as a logic high in FIG. 7) to the second logic state (illustrated as a logic low in FIG. 7). In this circumstance, the change of the second mode transition control signal TR2 from the first logic state to the second logic state indicates that the boost duty cycle D2 has become smaller than the second boost duty threshold ($D_{TH2}$-H2). Accordingly, the second mode transition control signal TR2 is configured to control the buck-boost power converter 100 to transit from the boost mode to the buck-boost mode (see the waveforms during the clock cycles 706 and 707 of the system clock signal CLK illustrated in FIG. 7). Meanwhile, the second reference pulse signal generation circuit 503 is configured to regulate the pulse width of the second reference pulse signal CR2 to increase in response to the second logic state of the second mode transition control signal TR2, so that the ratio of the pulse width of the second reference pulse signal CR2 to the period of the second reference pulse signal CR2 is increased to be equal to the boost duty threshold $D_{TH2}$.

Therefore, the boost duty cycle sensing and comparison circuit 1052 can regulate the buck-boost power converter 100 to transit between the buck-boost mode and the boost mode based on comparing the pulse width of the third control signal DR3 with the pulse width the of second reference pulse signal CR2.

Figure 10:
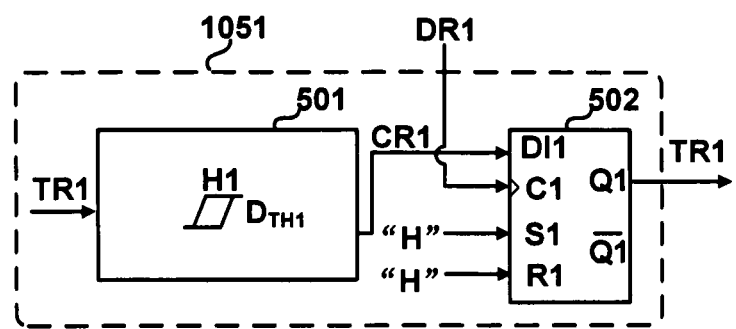
FIG. 10 illustrates a schematic diagram of a mode transition control module 105 in accordance with an alternative embodiment of the present invention.
Figure 10:
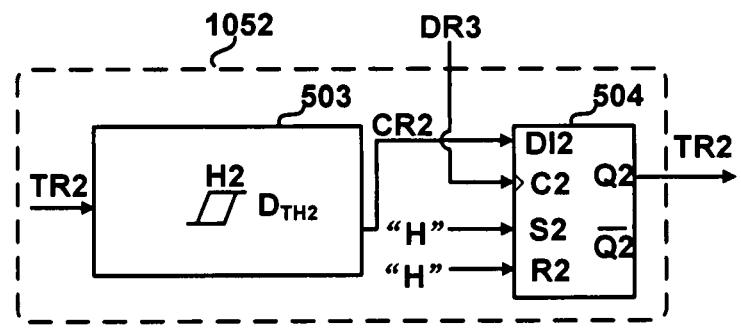

The above descriptions to the mode transition control module 105 with reference to FIG. 5 to FIG. 7 are exemplary and not intended too be limiting. One of ordinary skill in the art should understand that the mode transition control module 105 may have many other implementation structures, various modifications and variations can be made to the mode transition control module 105 provided in the present disclosure. For instance, in the example of FIG. 5, the signals received at the first data input terminal DI1 and at the first clock input terminal C1 by the first D flip-flop 502 can be exchanged, i.e. the first data input terminal D1 can be configured to receive the first reference pulse signal CR1 while the first clock input terminal C1 can be configured to receive the first control signal DR1, as shown in FIG. 10. In this circumstance, the first control signal DR1 is input as a clock signal of the first D flip-flop 502, and thus the first D flip-flop 502 is triggered at each falling edge of the first control signal DR1 and transmits the data (i.e. a logic state of the first reference pulse signal CR1 in the example of FIG. 10) received at the first data input terminal DI1 to the first non-inverse output terminal Q1 and holds that data at the first non-inverse output terminal Q1 until the next falling edge of the first reference pulse signal CR1 comes. The working principles of the buck duty cycle sensing and comparison circuit 1051 shown in FIG. 10 are similar as the working principles of the buck duty cycle sensing and comparison circuit 1051 shown in FIG. 5. The difference lies in that the first D flip-flop 502 illustrated in the example of FIG. 10 receives the first control signal DR1 as its clock signal, and thus judges whether the pulse width of the first control signal is larger or smaller than the pulse width of the first reference pulse signal by judging the logic state (e.g. high or low) of the first reference pulse signal CR1 at each falling edge of the first control signal DR1. Therefore, in the exemplary embodiment shown in FIG. 10, the first mode transition control signal TR1 is configured to regulate the buck-boost power converter 100 to transit from the buck mode to the buck-boost mode when the first mode transition control signal TR1 changes from the first logic state to the second logic state, while when the first mode transition control signal TR1 changes from the second logic state to the first logic state, the first mode transition control signal TR1 is configured to regulate the buck-boost power converter 100 to transit from the buck-boost mode to the buck mode.

Similarly, in the example of FIG. 5, the signals received at the second data input terminal DI2 and at the second clock input terminal C2 by the second D flip-flop 504 may also be exchanged, i.e. the second data input terminal D2 can be configured to receive the second reference pulse signal CR2 while the second clock input terminal C2 can be configured to receive the third control signal DR3, as shown in FIG. 10. In this circumstance, the third control signal DR3 is input as a clock signal of the second D flip-flop 504, and thus the second D flip-flop 504 is triggered at each falling edge of the third control signal DR3 and transmits the data (i.e. a logic state of the second reference pulse signal CR2 in the example of FIG. 10) received at the second data input terminal DI2 to the second non-inverse output terminal Q2 and holds that data at the second non-inverse output terminal Q2 until the next falling edge of the second reference pulse signal CR2 comes. The working principles of the boost duty cycle sensing and comparison circuit 1052 shown in FIG. 10 are similar as the working principles of the boost duty cycle sensing and comparison circuit 1052 shown in FIG. 5. The difference lies in that the second D flip-flop 504 illustrated in the example of FIG. 10 receives the third control signal DR3 as its clock signal, and thus judges whether the pulse width of the third control signal DR3 is larger or smaller than the pulse width of the second reference pulse signal CR2 by judging the logic state (e.g. high or low) of the second reference pulse signal CR2 at each falling edge of the third control signal DR3. Therefore, in the exemplary embodiment shown in FIG. 10, the second mode transition control signal TR2 is configured to regulate the buck-boost power converter 100 to transit from the buck-boost mode to the boost mode when the second mode transition control signal TR2 changes from the first logic state to the second logic state, while when the second mode transition control signal TR2 changes from the second logic state to the first logic state, the second mode transition control signal TR2 is configured to regulate the buck-boost power converter 100 to transit from the boost mode to the buck-boost mode.

In other embodiments, the mode transition control module 105 may be configured to implement the comparison of the buck duty cycle D1 and the boost duty cycle D2 to their corresponding duty thresholds by utilizing other suitable signals carrying the buck duty cycle D1 information and the boost duty cycle D2 information. For instance, in an alternative embodiment of the present invention, the first control signal DR1 illustrated in the examples shown in FIG. 5 and FIG. 10 may be replaced by the second control signal DR2. Since the second control signal DR2 is logic complementary with the first control signal DR1, the operation principles of such an alternative embodiment will be obvious for one of ordinary skill in the art and thus will not be addressed herein. In another alternative embodiment of the present invention, the third control signal DR3 illustrated in the examples shown in FIG. 5 and FIG. 10 may be replaced by the fourth control signal DR4. Since the fourth control signal DR4 is logic complementary with the third control signal DR3, the operation principles of such another alternative embodiment will be obvious for one of ordinary skill in the art and thus will not be addressed herein. One of ordinary skill in the art should understand that signals carrying the buck duty cycle D1 information and the boost duty cycle D2 information are not limited to the control signals (e.g. the first control signal DR1, the second control signal DR2, the third control signal DR3 and the fourth control signal DR4).

In the following, another alternative embodiment of the mode transition control module 105 will be described with reference to FIG. 11 to FIG. 13, wherein the first pulse width modulation signal PWM1 and the second pulse width modulation signal PWM2 are provided to the mode transition control module 105. In accordance with an embodiment of the present invention, the first pulse width modulation signal PWM1 and the second pulse width modulation signal PWM2 are narrow pulse signals. Each rising edge of the system clock signal CLK of the buck-boost power converter 100 determines a switch-ON moment of the first power switch SWA in the first switch pair in each buck cycle and determines a switch-ON moment of the third power switch SWC in the second switch pair in each boost cycle. Meanwhile, each rising edge of the first pulse width modulation signal PWM1 determines a switch-OFF moment of the first power switch SWA in the first switch pair in each buck cycle and each rising edge of the second pulse width modulation signal PWM2 determines a switch-OFF moment of the third power switch SWC in the second switch pair in each boost cycle. Therefore, each rising edge of the first pulse width modulation signal PWM1 actually corresponds to a falling edge of the first control signal DR1 and each rising edge of the second pulse width modulation signal PWM2 actually corresponds to a falling edge of the third control signal DR3. Thus, the first pulse width modulation signal PWM1 may be used to replace the first control signal DR1, and the second pulse width modulation signal PWM2 may be used to replace the third control signal DR3 in the embodiment shown in FIG. 10.

Figure 11:
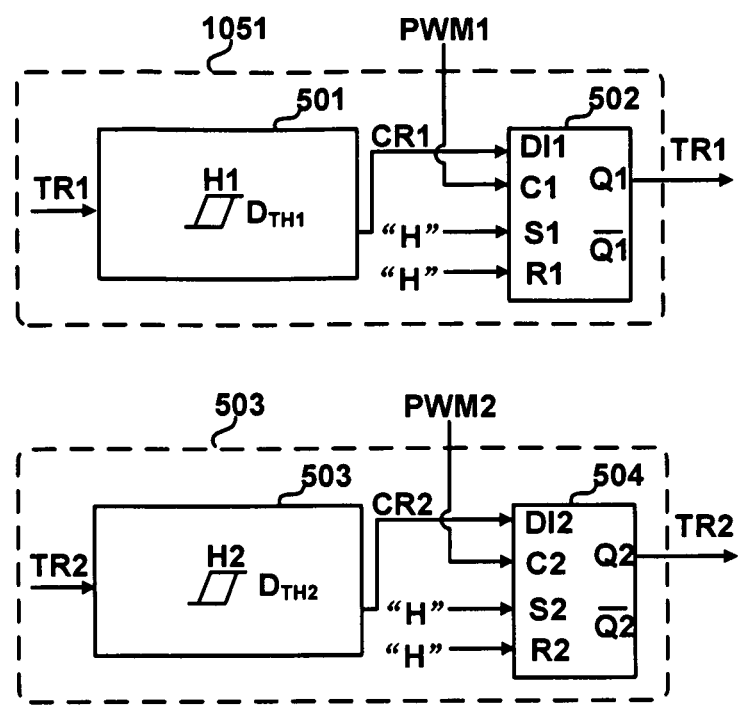
FIG. 11 illustrates a schematic diagram of a mode transition control module 105 in accordance with another alternative embodiment of the present invention.

FIG. 11 illustrates a schematic diagram of a mode transition control module 105 in accordance with an alternative embodiment of the present invention. Compared to the embodiment shown in FIG. 10, in the alternative embodiment shown in FIG. 11, the first pulse width modulation signal PWM1 may be provided to replace the first control signal DR1 and the first D flip-flop 502 may be a clock rising edge triggered flip-flop. The first clock input terminal C1 of the first D flip-flop 502 is configured to receive the first pulse width modulation signal PWM1. The working principles of the buck duty cycle sensing and comparison circuit 1051 shown in FIG. 11 are similar as the working principles of the buck duty cycle sensing and comparison circuit 1051 shown in FIG. 10. The difference lies in that the first D flip-flop 502 illustrated in the example of FIG. 11 is a clock rising edge triggered flip-flop and receives the first pulse width modulation signal as its clock signal, and thus judges whether the pulse width of the first control signal DR1 is larger or smaller than the pulse width of the first reference pulse signal CR1 by judging the logic state (e.g. high or low) of the first reference pulse signal CR1 at each rising edge of the first pulse width modulation signal PWM1. Therefore, in the exemplary embodiment shown in FIG. 11, the first mode transition control signal TR1 is configured to regulate the buck-boost power converter 100 to transit from the buck mode to the buck-boost mode when the first mode transition control signal TR1 changes from the first logic state to the second logic state, while when the first mode transition control signal TR1 changes from the second logic state to the first logic state, the first mode transition control signal TR1 is configured to regulate the buck-boost power converter 100 to transit from the buck-boost mode to the buck mode.

Figure 12:
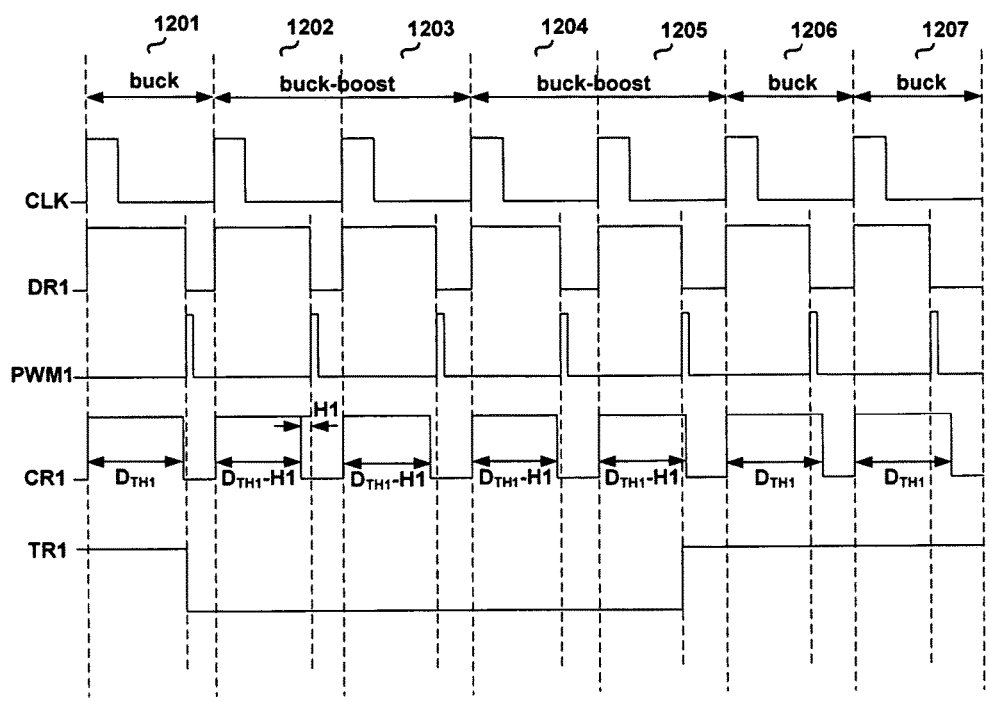
FIG. 12 illustrates an operating waveform diagram of the buck duty cycle sensing and comparison circuit 1051 illustrated in FIG. 11 in accordance with an embodiment of the present invention.

The working principles of the buck duty cycle sensing and comparison circuit 1051 shown in FIG. 11 can be better understood when further referring to the illustration in FIG. 12. FIG. 12 illustrates an operating waveform diagram of the buck duty cycle sensing and comparison circuit 1051 illustrated in FIG. 11 in accordance with an embodiment of the present invention. At each rising edge of the first pulse width modulation signal PWM1, if the first reference pulse signal CR1 is still at the second logic state (illustrated as a logic low in FIG. 12), it indicates that the pulse width of the first control signal DR1 is larger than the pulse width of the first reference pulse signal CR1, which also indicates that the buck duty cycle D1 is larger than the buck duty threshold $D_{TH1}$. At this moment, the first D flip-flop 502 is triggered by the rising edge of the first pulse width modulation signal PWM1 and transmits the second logic state (illustrated as a logic low in FIG. 12) of the first reference pulse signal CR1 to the first non-inverse output terminal Q1, resulting in the first mode transition control signal TR1 changing from the first logic state (illustrated as a logic high in FIG. 12) to the second logic state (illustrated as a logic low in FIG. 12). Accordingly, the first mode transition control signal TR1 is configured to control the buck-boost power converter 100 to transit from the buck mode to the buck-boost mode (see the waveforms during the clock cycles 1202 and 1203 of the system clock signal CLK illustrated in FIG. 12). Meanwhile, the first reference pulse signal generation circuit 501 is configured to regulate the pulse width of the first reference pulse signal CR1 to decrease in response to the second logic state of the first mode transition control signal TR1, so that the ratio of the pulse width of the first reference pulse signal CR1 to the period of the first reference pulse signal CR1 is decreased to be equal to the second buck duty threshold $(D_{TH1}-H1)$.

At each rising edge of the first pulse width modulation signal PWM1, if the first reference pulse signal CR1 is still at the first logic state (illustrated as a logic high in FIG. 12), it indicates that the pulse width of the first control signal DR1 is smaller than the pulse width of the first reference pulse signal CR1, which also indicates that the buck duty cycle D1 is smaller than the second buck duty threshold $(D_{TH1}-H1)$. At this moment, the first D flip-flop 502 is triggered by the rising edge of the first pulse width modulation signal PWM1 and transmits the first logic state (illustrated as a logic high in FIG. 12) of the first reference pulse signal CR1 to the first non-inverse output terminal Q1, resulting in the first mode transition control signal TR1 changing from the second logic state (illustrated as a logic low in FIG. 12) to the first logic state (illustrated as a logic high in FIG. 12). Accordingly, the first mode transition control signal TR1 is configured to control the buck-boost power converter 100 to transit from the buck-boost mode to the buck mode (see the waveforms during the clock cycles 1206 and 1207 of the system clock signal CLK illustrated in FIG. 12). Meanwhile, the first reference pulse signal generation circuit 501 is configured to regulate the pulse width of the first reference pulse signal CR1 to increase in response to the first logic state of the first mode transition control signal TR1, so that the ratio of the pulse width of the first reference pulse signal CR1 to the period of the first reference pulse signal CR1 is increased to be equal to the buck duty threshold $D_{TH1}$.

Similarly, in still another alternative embodiment also referring to the illustration of FIG. 11, compared to the embodiment shown in FIG. 10, the second pulse width modulation signal PWM2 may be provided to replace the third control signal DR3 and the second D flip-flop 504 may be a clock rising edge triggered flip-flop. The second clock input terminal C2 of the second D flip-flop 504 is configured to receive the second pulse width modulation signal PWM2. The working principles of the boost duty cycle sensing and comparison circuit 1052 shown in FIG. 11 are similar as the working principles of the buck duty cycle sensing and comparison circuit 1051 shown in FIG. 10. The difference lies in that the second D flip-flop 504 illustrated in the example of FIG. 11 is a clock rising edge triggered flip-flop and receives the second pulse width modulation signal PWM2 as its clock signal, and thus judges whether the pulse width of the third control signal DR3 is larger or smaller than the pulse width of the second reference pulse signal CR2 by judging the logic state (e.g. high or low) of the second reference pulse signal CR2 at each rising edge of the second pulse width modulation signal PWM2. Therefore, in the exemplary embodiment shown in FIG. 11, the second mode transition control signal TR2 is configured to regulate the buck-boost power converter 100 to transit from the buck-boost mode to the boost mode when the second mode transition control signal TR2 changes from the first logic state to the second logic state, while when the second mode transition control signal TR2 changes from the second logic state to the first logic state, the second mode transition control signal TR2 is configured to regulate the buck-boost power converter 100 to transit from the boost mode to the buck-boost mode.

Figure 13:
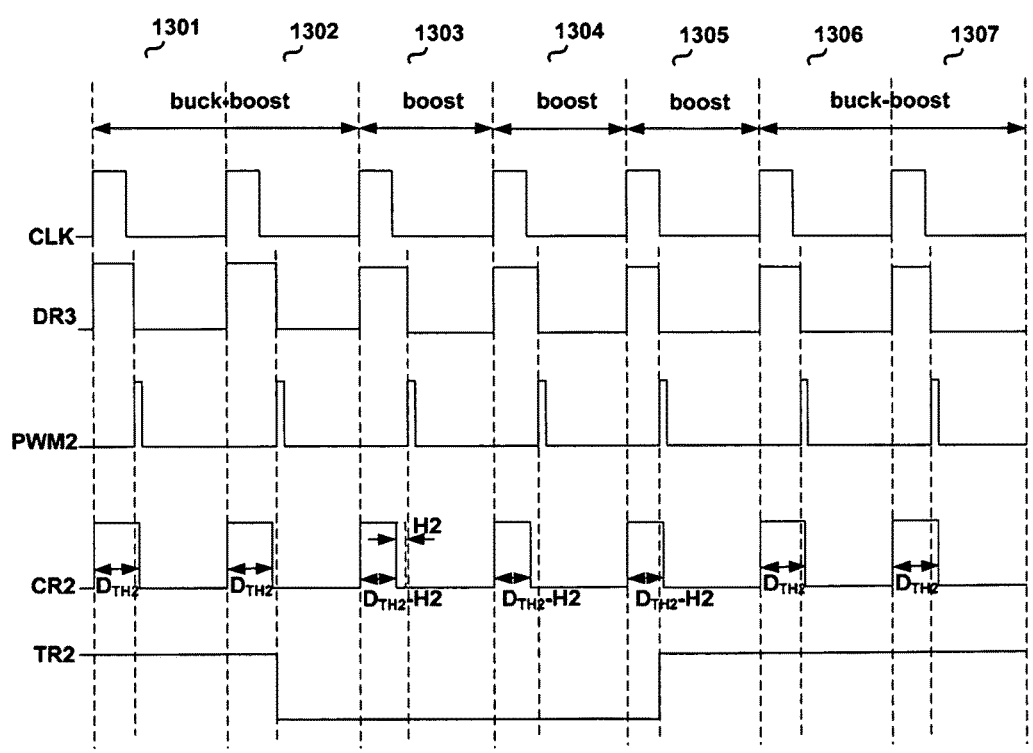
FIG. 13 illustrates an operating waveform diagram of the boost duty cycle sensing and comparison circuit 1052 illustrated in FIG. 11 in accordance with an embodiment of the present invention.

The working principles of the boost duty cycle sensing and comparison circuit 1052 shown in FIG. 11 can be better understood when further referring to the illustration in FIG. 13. FIG. 13 illustrates an operating waveform diagram of the boost duty cycle sensing and comparison circuit 1052 illustrated in FIG. 11 in accordance with an embodiment of the present invention. At each rising edge of the second pulse width modulation signal PWM1, if the second reference pulse signal CR1 is still at the second logic state (illustrated as a logic low in FIG. 13), it indicates that the pulse width of the third control signal DR3 is larger than the pulse width of the second reference pulse signal CR2, which also indicates that the boost duty cycle D2 is larger than the boost duty threshold $D_{TH2}$. At this moment, the second D flip-flop 504 is triggered by the rising edge of the second pulse width modulation signal PWM2 and transmits the second logic state (illustrated as a logic low in FIG. 13) of the second reference pulse signal CR2 to the second non-inverse output terminal Q2, resulting in the second mode transition control signal TR2 changing from the first logic state (illustrated as a logic high in FIG. 13) to the second logic state (illustrated as a logic low in FIG. 13). Accordingly, the first mode transition control signal TR1 is configured to control the buck-boost power converter 100 to transit from the buck mode to the buck-boost mode (see the waveforms during the clock cycles 1302 and 1303 of the system clock signal CLK illustrated in FIG. 13). Meanwhile, the second reference pulse signal generation circuit 503 is configured to regulate the pulse width of the second reference pulse signal CR2 to decrease in response to the second logic state of the second mode transition control signal TR2, so that the ratio of the pulse width of the second reference pulse signal CR2 to the period of the second reference pulse signal CR2 is decreased to be equal to the second boost duty threshold $(D_{TH2}-H2)$.

At each rising edge of the second pulse width modulation signal PWM2, if the second reference pulse signal CR2 is still at the first logic state (illustrated as a logic high in FIG. 13), it indicates that the pulse width of the third control signal DR3 is smaller than the pulse width of the second reference pulse signal CR2, which also indicates that the boost duty cycle D2 is smaller than the second boost duty threshold $(D_{TH2}-H2)$. At this moment, the second D flip-flop 504 is triggered by the rising edge of the second pulse width modulation signal PWM2 and transmits the first logic state (illustrated as a logic high in FIG. 13) of the second reference pulse signal CR2 to the second non-inverse output terminal Q2, resulting in the second mode transition control signal TR2 changing from the second logic state (illustrated as a logic low in FIG. 13) to the first logic state (illustrated as a logic high in FIG. 13). Accordingly, the second mode transition control signal TR2 is configured to control the buck-boost power converter 100 to transit from the boost mode to the buck-boost mode (see the waveforms during the clock cycles 1306 and 1307 of the system clock signal CLK illustrated in FIG. 13). Meanwhile, the second reference pulse signal generation circuit 503 is configured to regulate the pulse width of the second reference pulse signal CR2 to increase in response to the first logic state of the second mode transition control signal TR2, so that the ratio of the pulse width of the second reference pulse signal CR2 to the period of the second reference pulse signal CR2 is increased to be equal to the boost duty threshold $D_{TH2}$.

In accordance with the various embodiments described with reference to FIG. 2 to FIG. 13, the control circuit 108 may be able to regulate the buck-boost power converter 100 to automatically transit smoothly between the buck mode and the buck-boost mode, and between the buck-boost mode and the boost mode. The control circuit 108 may comprise the mode transition control module 105. The mode transition control module 105 may be able to sense the buck duty cycle D1 and the boost duty cycle D2 and to compare the sensed buck duty cycle D1 and the sensed boost duty cycle D2 respectively with a buck duty threshold and a boost duty threshold to regulate the buck-boost power converter 100 to conduct mode transition based on the comparison results. In an embodiment, the mode transition control module 105 is configured to implement the sensing of the buck duty cycle D1 and the boost duty cycle D2 by utilizing signals (such as the control signals DR1~DR4 of the switch module and/or the pulse width modulation signals PWM1 and PWM2) carrying the buck duty cycle D1 information and the boost duty cycle D2 information. Therefore, the mode transition control module 105 does not require extra duty cycle sensing circuit but utilizes existing signals in the control circuit 108 to fulfill the sensing of the buck duty cycle D1 and the boost duty cycle D2, which is simple to implement, cost saving and beneficial for improving the integration density. In some embodiments (e.g. the embodiments shown in FIGS. 5, 10 and 11), the mode transition control module 105 is configured to compare the pulse width of the first control signal DR1 with the pulse width of the first reference pulse signal CR1 to realize the comparison of the buck duty cycle D1 with the buck duty threshold $D_{TH1}$ and the second buck duty threshold ($D_{TH1}$-H1), so as to accurately control the buck-boost power converter 100 to conduct mode transition between the buck mode and the buck-boost mode. With the mode transition control module 105, the buck-boost power converter 100 can transit between the buck mode and the buck-boost mode smoothly without suffering from un-desired back and forth transitions between the buck mode and the buck-boost mode resulted from false triggering and without provoking large sparks in the output voltage Vo. In some embodiments (e.g. the embodiments shown in FIGS. 5, 10 and 11), the mode transition control module 105 is further configured to compare the pulse width of the third control signal DR3 with the pulse width of the second reference pulse signal CR2 to realize the comparison of the boost duty cycle D2 with the boost duty threshold $D_{TH2}$ and the second boost duty threshold ($D_{TH2}$-H2), so as to accurately control the buck-boost power converter 100 to conduct mode transition between the buck-boost mode and the boost mode. With the mode transition control module 105, the buck-boost power converter 100 can transit between the buck-boost mode and the boost mode smoothly without suffering from un-desired back and forth transitions between the buck-boost mode and the boost mode resulted from false triggering and without provoking large sparks in the output voltage Vo.

The advantages of the various embodiments of the buck-boost converter 100, the control circuit 108 and the mode transition control module 105 are not confined to those described above. These and other advantages of the various embodiments of the present invention will become more apparent upon reading the whole detailed descriptions and studying the various figures of the drawings.

From the foregoing, it will be appreciated that specific embodiments of the present invention have been described herein for purposes of illustration, but that various modifications may be made without deviating from the spirit and scope of various embodiments of the present invention. Many of the elements of one embodiment may be combined with other embodiments in addition to or in lieu of the elements of the other embodiments. Accordingly, the present invention is not limited except as by the appended claims.

What is claimed is:

1. A mode transition control module for regulating a buck-boost power converter to transit between a buck mode and a buck-boost mode and between the buck-boost mode and a boost mode, the mode transition control module comprising:

a buck duty cycle sensing and comparison circuit configured to receive a first signal indicative of a buck duty cycle of the buck-boost power converter, and to compare the first signal with a first reference pulse signal having a pulse width indicative of a buck duty threshold to provide a first mode transition control signal; wherein the first mode transition control signal is configured to regulate the pulse width of the first reference pulse signal so that the buck duty threshold has a first hysteresis; and wherein when the buck duty cycle is larger than the buck duty threshold, the first mode transition control signal is configured to regulate the buck-boost power converter to transit from the buck mode to the buck-boost mode and meanwhile to decrease the pulse width of the first reference pulse signal to make the buck duty threshold to decrease to a second buck duty threshold with a decrement equals to the first hysteresis; and wherein when the buck duty cycle is smaller than the second buck duty threshold, the first mode transition control signal is configured to regulate the buck-boost power converter to transit from the buck-boost mode to the buck mode and meanwhile to to increase the pulse width of the first reference pulse signal to make the buck duty threshold to restore from the second buck duty threshold to the buck duty threshold; and a boost duty cycle sensing and comparison circuit configured to receive a second signal indicative of a boost duty cycle of the buck-boost power converter, and to compare the second signal with a second reference pulse signal having a pulse width indicative of a boost duty threshold to provide a second mode transition control signal; wherein the second mode transition control signal is configured to regulate the pulse width of the second reference pulse signal so that the boost duty threshold has a second hysteresis; and wherein when the boost duty cycle is larger than the boost duty threshold, the second mode transition control signal is configured to regulate the buck-boost power converter to transit from the buck-boost mode to the boost mode, and meanwhile to decrease the pulse width of the second reference pulse signal to make the boost duty threshold to decrease to a second boost duty threshold with a decrement equals to the second hysteresis; and wherein when the boost duty cycle is smaller than the second boost duty threshold, the second mode transition control signal is further configured to regulate the buck-boost power converter to transit from the boost mode to the buck-boost mode, and meanwhile to increase the pulse width of the second reference pulse signal to make the boost duty threshold to restore from the second boost duty threshold to the boost duty threshold.

2. The mode transition control module of claim 1, wherein the first signal comprises a first control signal or a second control signal, and wherein the first control signal and the second control signal are respectively configured to control a first power switch and a second power switch coupled in series between an input port and a reference ground of the buck-boost power converter; and wherein the buck duty cycle sensing and comparison circuit is configured to compare the pulse width of the first control signal with the pulse width of the first reference pulse signal to generate the first mode transition control signal.

3. The mode transition control module of claim 2, wherein the buck duty cycle sensing and comparison circuit comprises:
   a first reference signal generation circuit configured to receive the first mode transition control signal at a control input terminal and to provide the first reference pulse signal at an output terminal, and further configured to regulate the pulse width of the first reference pulse signal based on the first mode transition control signal so that a ratio of the pulse width of the first reference pulse signal to a period of the first reference pulse signal equals to the second buck duty threshold when the buck duty cycle is larger than the buck duty threshold and equals to the buck duty threshold when the buck duty cycle is smaller than the second buck duty threshold; and
   a first D flip-flop having a first data input terminal, a first clock input terminal and a first non-inverse output terminal, wherein the first data input terminal is configured to receive the first control signal and the first clock input terminal is configured to receive the first reference pulse signal, and wherein the first D flip-flop is configured to transmit the first control signal received at the first data input terminal to the first non-inverse output terminal at each falling edge of the first reference pulse signal and hold and provide the transmitted first control signal as the first transition control signal at the first non-inverse output terminal until the next falling edge of the first reference pulse signal comes; and wherein
   each of the first control signal, the first reference pulse signal and the first mode transition control signal has a first logic state and a second logic state; and wherein the first mode transition control signal changing from the second logic state to the first logic state indicates that the buck duty cycle is larger than the buck duty threshold; and wherein the first mode transition control signal changing from the first logic state to the second logic state indicates that the buck duty cycle is smaller than the second buck duty threshold.

4. The mode transition control module of claim 2, wherein the buck duty cycle sensing and comparison circuit comprises:
   a first reference signal generation circuit configured to receive the first mode transition control signal at a control input terminal and to provide the first reference pulse signal at an output terminal, and further configured to regulate the pulse width of the first reference pulse signal based on the first mode transition control signal so that a ratio of the pulse width of the first reference pulse signal to a period of the first reference pulse signal equals to the second buck duty threshold when the buck duty cycle is larger than the buck duty threshold and equals to the buck duty threshold when the buck duty cycle is smaller than the second buck duty threshold; and
   a first D flip-flop having a first data input terminal, a first clock input terminal and a first non-inverse output terminal, wherein the first data input terminal is configured to receive the second control signal and the first clock input terminal is configured to receive the first reference pulse signal, and wherein the first D flip-flop is configured to transmit the second control signal received at the first data input terminal to the first non-inverse output terminal at each falling edge of the first reference pulse signal and hold and provide the transmitted second control signal as the first transition control signal at the first non-inverse output terminal until the next falling edge of the first reference pulse signal comes; and wherein
   each of the second control signal, the first reference pulse signal and the first mode transition control signal has a first logic state and a second logic state; and wherein the first mode transition control signal changing from the first logic state to the second logic state indicates that the buck duty cycle is larger than the buck duty threshold; and wherein the first mode transition control signal changing from the second logic state to the first logic state indicates that the buck duty cycle is smaller than the second buck duty threshold.

5. The mode transition control module of claim 2, wherein the buck duty cycle sensing and comparison circuit comprises:
   a first reference signal generation circuit configured to receive the first mode transition control signal at a control input terminal and to provide the first reference pulse signal at an output terminal, and further configured to regulate the pulse width of the first reference pulse signal based on the first mode transition control signal so that a ratio of the pulse width of the first reference pulse signal to a period of the first reference pulse signal equals to the second buck duty threshold when the buck duty cycle is larger than the buck duty threshold and equals to the buck duty threshold when the buck duty cycle is smaller than the second buck duty threshold; and
   a first D flip-flop having a first data input terminal, a first clock input terminal and a first non-inverse output terminal, wherein the first data input terminal is configured to receive the first reference pulse signal and the first clock input terminal is configured to receive the first control signal, and wherein the first D flip-flop is configured to transmit the first reference pulse signal received at the first data input terminal to the first non-inverse output terminal at each falling edge of the first control signal and hold and provide the transmitted first reference pulse signal as the first transition control signal at the first non-inverse output terminal until the next falling edge of the first control signal comes; and wherein each of the first control signal, the first reference pulse signal and the first mode transition control signal has a first logic state and a second logic state; and wherein the first mode transition control signal changing from the first logic state to the second logic state indicates that the buck duty cycle is larger than the buck duty threshold; and wherein the first mode transition control signal changing from the second logic state to the first logic state indicates that the buck duty cycle is smaller than the second buck duty threshold.

6. The mode transition control module of claim 2, wherein the buck duty cycle sensing and comparison circuit comprises:

a first reference signal generation circuit configured to receive the first mode transition control signal at a control input terminal and to provide the first reference pulse signal at an output terminal, and further configured to regulate the pulse width of the first reference pulse signal based on the first mode transition control signal so that a ratio of the pulse width of the first reference pulse signal to a period of the first reference pulse signal equals to the second buck duty threshold when the buck duty cycle is larger than the buck duty threshold and equals to the buck duty threshold when the buck duty cycle is smaller than the second buck duty threshold; and a first D flip-flop having a first data input terminal, a first clock input terminal and a first non-inverse output terminal, wherein the first data input terminal is configured to receive the first reference pulse signal and the first clock input terminal is configured to receive the second control signal, and wherein the first D flip-flop is configured to transmit the first reference pulse signal received at the first data input terminal to the first non-inverse output terminal at each rising edge of the second control signal and hold and provide the transmitted first reference pulse signal as the first transition control signal at the first non-inverse output terminal until the next rising edge of the second control signal comes; and wherein each of the second control signal, the first reference pulse signal and the first mode transition control signal has a first logic state and a second logic state; and wherein the first mode transition control signal changing from the first logic state to the second logic state indicates that the buck duty cycle is larger than the buck duty threshold; and wherein the first mode transition control signal changing from the second logic state to the first logic state indicates that the buck duty cycle is smaller than the second buck duty threshold.

7. The mode transition control module of claim 1, wherein the buck duty cycle sensing and comparison circuit comprises:

a first reference signal generation circuit configured to receive the first mode transition control signal at a control input terminal and to provide a first reference pulse signal at an output terminal, and further configured to regulate a pulse width of the first reference pulse signal based on the first mode transition control signal so that a ratio of the pulse width of the first reference pulse signal to a period of the first reference pulse signal equals to the second buck duty threshold when the buck duty cycle is larger than the buck duty threshold and equals to the buck duty threshold when the buck duty cycle is smaller than the second buck duty threshold; and a first D flip-flop having a first data input terminal, a first clock input terminal and a first non-inverse output terminal, wherein the first data input terminal is configured to receive the first reference pulse signal and the first clock input terminal is configured to receive a first pulse width modulation signal determining a switch-OFF moment of a first power switch coupled in series with a second power switch between an input port and a reference ground of the buck-boost power converter, and wherein the first D flip-flop is configured to transmit the first reference pulse signal received at the first data input terminal to the first non-inverse output terminal at each rising edge of the first pulse width modulation signal and hold and provide the transmitted first reference pulse signal as the first transition control signal at the first non-inverse output terminal until the next rising edge of the first pulse width modulation signal comes; and wherein each of the first reference pulse signal and the first mode transition control signal has a first logic state and a second logic state; and wherein the first mode transition control signal changing from the first logic state to the second logic state indicates that the buck duty cycle is larger than the buck duty threshold; and wherein the first mode transition control signal changing from the second logic state to the first logic state indicates that the buck duty cycle is smaller than the second buck duty threshold.

8. The mode transition control module of claim 1, wherein the second signal comprises a third control signal or a fourth control signal, and wherein the third control signal and the fourth control signal are respectively configured to control a third power switch and a fourth power switch coupled in series between an output port and a reference ground of the buck-boost power converter; and wherein the boost duty cycle sensing and comparison circuit is configured to compare the pulse width of the third control signal with the pulse width of the second reference pulse signal to generate the second mode transition control signal.

9. The mode transition control module of claim 8, wherein the boost duty cycle sensing and comparison circuit comprises:

a second reference signal generation circuit configured to receive the second mode transition control signal at a control input terminal and to provide the second reference pulse signal at an output terminal, and further configured to regulate the pulse width of the second reference pulse signal based on the second mode transition control signal so that a ratio of the pulse width of the second reference pulse signal to a period of the second reference pulse signal equals to the second boost duty threshold when the boost duty cycle is larger than the boost duty threshold and equals to the boost duty threshold when the boost duty cycle is smaller than the second boost duty threshold; and a second D flip-flop having a second data input terminal, a second clock input terminal and a second non-inverse output terminal, wherein the second data input terminal is configured to receive the third control signal and the second clock input terminal is configured to receive the second reference pulse signal, and wherein the second D flip-flop is configured to transmit the third control signal received at the second data input terminal to the second non-inverse output terminal at each falling edge of the second reference pulse signal and hold and provide the transmitted third control signal as the second transition control signal at the second non-inverse output terminal until the next falling edge of the second reference pulse signal comes; and wherein each of the third control signal, the second reference pulse signal and the second mode transition control signal has a first logic state and a second logic state; and wherein the second mode transition control signal changing from the second logic state to the first logic state indicates that the boost duty cycle is larger than the boost duty threshold; and wherein the second mode transition control signal changing from the first logic state to the second logic state indicates that the boost duty cycle is smaller than the second boost duty threshold.

10. The mode transition control module of claim 8, wherein the boost duty cycle sensing and comparison circuit comprises:

a second reference signal generation circuit configured to receive the second mode transition control signal at a control input terminal and to provide the second reference pulse signal at an output terminal, and further configured to regulate the pulse width of the second reference pulse signal based on the second mode transition control signal so that a ratio of the pulse width of the second reference pulse signal to a period of the second reference pulse signal equals to the second boost duty threshold when the boost duty cycle is larger than the boost duty threshold and equals to the boost duty threshold when the boost duty cycle is smaller than the second boost duty threshold; and a second D flip-flop having a second data input terminal, a second clock input terminal and a second non-inverse output terminal, wherein the second data input terminal is configured to receive the fourth control signal and the second clock input terminal is configured to receive the second reference pulse signal, and wherein the second D flip-flop is configured to transmit the fourth control signal received at the second data input terminal to the second non-inverse output terminal at each falling edge of the second reference pulse signal and hold and provide the transmitted fourth control signal as the second transition control signal at the second non-inverse output terminal until the next falling edge of the second reference pulse signal comes; and wherein each of the fourth control signal, the second reference pulse signal and the second mode transition control signal has a first logic state and a second logic state; and wherein the second mode transition control signal changing from the first logic state to the second logic state indicates that the boost duty cycle is larger than the boost duty threshold; and wherein the second mode transition control signal changing from the second logic state to the first logic state indicates that the boost duty cycle is smaller than the second boost duty threshold.

11. The mode transition control module of claim 8, wherein the boost duty cycle sensing and comparison circuit comprises:

a second reference signal generation circuit configured to receive the second mode transition control signal at a control input terminal and to provide the second reference pulse signal at an output terminal, and further configured to regulate the pulse width of the second reference pulse signal based on the second mode transition control signal so that a ratio of the pulse width of the second reference pulse signal to a period of the second reference pulse signal equals to the second boost duty threshold when the boost duty cycle is larger than the boost duty threshold and equals to the boost duty threshold when the boost duty cycle is smaller than the second boost duty threshold; and a second D flip-flop having a second data input terminal, a second clock input terminal and a second non-inverse output terminal, wherein the second data input terminal is configured to receive the second reference pulse signal and the second clock input terminal is configured to receive the third control signal, and wherein the second D flip-flop is configured to transmit the second reference pulse signal received at the second data input terminal to the second non-inverse output terminal at each falling edge of the third control signal and hold and provide the transmitted second reference pulse signal as the second transition control signal at the second non-inverse output terminal until the next falling edge of the third control signal comes; and wherein each of the third control signal, the second reference pulse signal and the second mode transition control signal has a first logic state and a second logic state; and wherein the second mode transition control signal changing from the first logic state to the second logic state indicates that the boost duty cycle is larger than the boost duty threshold; and wherein the second mode transition control signal changing from the second logic state to the first logic state indicates that the boost duty cycle is smaller than the second boost duty threshold.

12. The mode transition control module of claim 8, wherein the boost duty cycle sensing and comparison circuit comprises:

a second reference signal generation circuit configured to receive the second mode transition control signal at a control input terminal and to provide the second reference pulse signal at an output terminal, and further configured to regulate the pulse width of the second reference pulse signal based on the second mode transition control signal so that a ratio of the pulse width of the second reference pulse signal to a period of the second reference pulse signal equals to the second boost duty threshold when the boost duty cycle is larger than the boost duty threshold and equals to the boost duty threshold when the boost duty cycle is smaller than the second boost duty threshold; and a second D flip-flop having a second data input terminal, a second clock input terminal and a second non-inverse output terminal, wherein the second data input terminal is configured to receive the second reference pulse signal and the second clock input terminal is configured to receive the fourth control signal, and wherein the second D flip-flop is configured to transmit the second reference pulse signal received at the second data input terminal to the second non-inverse output terminal at each rising edge of the fourth control signal and hold and provide the transmitted second reference pulse signal as the second transition control signal at the second non-inverse output terminal until the next rising edge of the fourth control signal comes; and wherein each of the fourth control signal, the second reference pulse signal and the second mode transition control signal has a first logic state and a second logic state; and wherein the second mode transition control signal changing from the first logic state to the second logic state indicates that the boost duty cycle is larger than the boost duty threshold; and wherein the second mode transition control signal changing from the second logic state to the first logic state indicates that the boost duty cycle is smaller than the second boost duty threshold.

13. The mode transition control module of claim 1, wherein the boost duty cycle sensing and comparison circuit comprises:
- a second reference signal generation circuit configured to receive the second mode transition control signal at a control input terminal and to provide a second reference pulse signal at an output terminal, and further configured to regulate a pulse width of the second reference pulse signal based on the second mode transition control signal so that a ratio of the pulse width of the second reference pulse signal to a period of the second reference pulse signal equals to the second boost duty threshold when the boost duty cycle is larger than the boost duty threshold and equals to the boost duty threshold when the boost duty cycle is smaller than the second boost duty threshold; and
- a second D flip-flop having a second data input terminal, a second clock input terminal and a second non-inverse output terminal, wherein the second data input terminal is configured to receive the second reference pulse signal and the second clock input terminal is configured to receive a second pulse width modulation signal determining a switch-OFF moment of a third power switch coupled in series with a fourth power switch between an output port and a reference ground of the buck-boost power converter, and wherein the second D flip-flop is configured to transmit the second reference pulse signal received at the second data input terminal to the second non-inverse output terminal at each rising edge of the second pulse width modulation signal and hold and provide the transmitted second reference pulse signal as the second transition control signal at the second non-inverse output terminal until the next rising edge of the second pulse width modulation signal comes; and wherein
- each of the second reference pulse signal and the second mode transition control signal has a first logic state and a second logic state; and wherein the second mode transition control signal changing from the first logic state to the second logic state indicates that the boost duty cycle is larger than the boost duty threshold; and wherein the second mode transition control signal changing from the second logic state to the first logic state indicates that the boost duty cycle is smaller than the second boost duty threshold.

14. A buck-boost power converter comprising:
- a switch module including a first switch pair and a second switch pair, wherein the first switch pair comprising a first power switch and a second power switch coupled in series between an input port and a reference ground, and wherein the second switch pair comprising a third power switch and a fourth power switch coupled in series between an output port and the reference ground; and
- a mode transition control module configured to regulate the buck-boost power converter to transit between a buck mode and a buck-boost mode and between the buck-boost mode and a boost mode, wherein the mode transition control module comprising:
  - a buck duty cycle sensing and comparison circuit configured to receive a first signal indicative of a buck duty cycle of the buck-boost power converter, and to compare the first signal with a first reference pulse signal having a pulse width indicative of a buck duty threshold to provide a first mode transition control signal; wherein the first mode transition control signal is configured to regulate the pulse width of the first reference pulse signal so that the buck duty threshold has a first hysteresis; and wherein when the buck duty cycle is larger than the buck duty threshold, the first mode transition control signal is configured to regulate the buck-boost power converter to transit from the buck mode to the buck-boost mode and meanwhile to change the pulse width of the first reference pulse signal to make the buck duty threshold to decrease to a second buck duty threshold with a decrement equals to the first hysteresis; and wherein when the buck duty cycle is smaller than the second buck duty threshold, the first mode transition control signal is configured to regulate the buck-boost power converter to transit from the buck-boost mode to the buck mode and meanwhile to to change the pulse width of the first reference pulse signal to make the buck duty threshold to restore from the second buck duty threshold to the buck duty threshold; and
  - a boost duty cycle sensing and comparison circuit configured to receive a second signal indicative of a boost duty cycle of the buck-boost power converter, and to compare the second signal with a second reference pulse signal having a pulse width indicative of a boost duty threshold to provide a second mode transition control signal; wherein the second mode transition control signal is configured to regulate the pulse width of the second reference pulse signal so that the boost duty threshold has a second hysteresis; and wherein when the boost duty cycle is larger than the boost duty threshold, the second mode transition control signal is configured to regulate the buck-boost power converter to transit from the buck-boost mode to the boost mode, and meanwhile to change the pulse width of the second reference pulse signal to make the boost duty threshold to decrease to a second boost duty threshold with a decrement equals to the second hysteresis; and wherein the second mode transition control signal is further configured to regulate the buck-boost power converter to transit from the boost mode to the buck-boost mode when the boost duty cycle is smaller than the second boost duty threshold, and meanwhile to change the pulse width of the second reference pulse signal to make the boost duty threshold to restore from the second boost duty threshold to the boost duty threshold.

15. The buck-boost power converter of claim 14, wherein:
in the buck mode, the buck-boost power converter is regulated to operate with buck cycles continuously, wherein in each of the buck cycles, the first power switch and the second power switch are controlled to conduct ON and OFF switching complementarily, while the third power switch is maintained OFF and the fourth power switch is maintained ON; and wherein
in the boost mode, the buck-boost power converter is regulated to operate with boost cycles continuously, wherein in each of the boost cycles, the third power switch and the fourth power switch are controlled to conduct ON and OFF switching complementarily, while the first power switch is maintained ON and the second power switch is maintained OFF; and wherein
in the buck-boost mode, the buck-boost power converter is regulated to operate with a buck cycle and a boost cycle in turn switching cycle by switching cycle.

16. The buck-boost power converter of claim 14, wherein the first power switch and the second power switch has a common connection forming a first switching node, and wherein the third power switch and the fourth power switch has a common connection forming a second switching node, and wherein the buck-boost power converter further comprises an inductive energy storage component coupled between the first switching node and the second switching node.

17. The buck-boost power converter of claim 14, further comprising:
a control circuit configured to receive a first feedback signal indicative of an output voltage of the buck-boost power converter, a second feedback signal indicative of a switching current flowing through the switch module, a reference signal indicative of a desired value of the output voltage and a system clock signal, wherein
the control circuit is configured to provide a first control signal, a second control signal, a third control signal and a fourth control signal respectively to the first power switch, the second power switch, the third power switch and the fourth power switch at least based on the first feedback signal, the second feedback signal, the reference signal and the system clock signal; wherein the first control signal and the second control signal are logically complementary and are respectively configured to control the first power switch and the second power switch to conduct ON and OFF switching, and wherein a fraction of an ON time of the first power switch to an entire switching cycle of the first power switch and the second power switch is referred to as a buck duty cycle; and wherein the third control signal and the fourth control signal are logically complementary and are respectively configured to control the third power switch and the fourth power switch to conduct ON and OFF switching, and wherein a fraction of an ON time of the third power switch to an entire switching cycle of the third power switch and the fourth power switch is referred to as a boost duty cycle.

18. The buck-boost power converter of claim 17, wherein the control circuit comprises:
an operational amplifier configured to receive the first feedback signal and the reference signal respectively, and further configured to conduct operation to the first feedback signal and the reference signal to provide an amplified difference signal indicative of a difference between the first feedback signal and the reference signal;
a current sensing and compensation module configured to sense the switching current to generate the second feedback signal, and further configured to compensate the second feedback signal by respectively adding a first slope compensation signal and a second slope compensation signal to the second feedback signal to respectively generate a first current sensing signal and a second current sensing signal, wherein the second slope compensation signal is generated by adding a predetermined bias voltage to the first slope compensation signal to make a peak value of the first slope compensation signal equal to a valley value of the second slope compensation signal;
a buck cycle pulse width modulation module configured to respectively receive the amplified difference signal and the first current sensing signal and to compare the first current sensing signal with the amplified difference signal to generate a first pulse width modulation signal;
a boost cycle pulse width modulation module configured to respectively receive the amplified difference signal and the second current sensing signal, and to compare the second current sensing signal with the amplified difference signal to generate a second pulse width modulation signal; and
a logic control module configured to at least receive the first pulse width modulation signal, the second pulse width modulation signal, the system clock signal, the first mode transition control signal and the second mode transition control signal and further configured to provide the first control signal, the second control signal, the third control signal and the fourth control signal based on the first pulse width modulation signal, the second pulse width modulation signal the system clock signal, the first mode transition control signal and the second mode transition control signal.

* * * * *